US011529593B2

(12) United States Patent
Johnston et al.

(10) Patent No.: US 11,529,593 B2
(45) Date of Patent: Dec. 20, 2022

(54) DIFFUSER FOR AERATION OF A FLUID

(71) Applicant: Aquatec Maxcon Pty Ltd, Ipswich (AU)

(72) Inventors: Gregory Johnston, Ipswich (AU); David Yule, Ipswich (AU); Kenneth Roy Wildbur, Ipswich (AU)

(73) Assignee: Aquatec Maxcon Pty Ltd, Ipswich (AU)

( * ) Notice: Subject to any disclaimer, the term of this patent is extended or adjusted under 35 U.S.C. 154(b) by 19 days.

(21) Appl. No.: 16/651,199

(22) PCT Filed: Sep. 28, 2018

(86) PCT No.: PCT/AU2018/051066
§ 371 (c)(1),
(2) Date: Mar. 26, 2020

(87) PCT Pub. No.: WO2019/060965
PCT Pub. Date: Apr. 4, 2019

(65) Prior Publication Data
US 2020/0289993 A1    Sep. 17, 2020

(30) Foreign Application Priority Data
Sep. 29, 2017   (AU) ................................ 2017903960

(51) Int. Cl.
*B01F 23/23*       (2022.01)
*B01F 23/231*      (2022.01)
(Continued)

(52) U.S. Cl.
CPC ........ *B01F 23/23124* (2022.01); *C02F 3/201* (2013.01); *B01F 23/2311* (2022.01);
(Continued)

(58) Field of Classification Search
CPC .............. B01F 3/04106; B01F 3/04241; B01F 15/00123; B01F 2003/04191;
(Continued)

(56) References Cited

U.S. PATENT DOCUMENTS 3,736,953 A   6/1973  Vaalburg
3,762,170 A   10/1973 Fitzhugh
(Continued)

FOREIGN PATENT DOCUMENTS

CN     103118991 A    5/2013
CN     106870806 A    6/2017
(Continued)

OTHER PUBLICATIONS

International Search Report of PCT/AU2018/051066.
(Continued)

*Primary Examiner* — Stephen Hobson
(74) *Attorney, Agent, or Firm* — Julie K. Staple

(57) ABSTRACT

An elongate diffuser (10) comprises a diffuser body (30), and a membrane (20) attached so that introduction of gas at a working pressure into the diffuser displaces part of the membrane (20) from contact with the diffuser body (10) providing an elongate sealed compartment (50) between the membrane (20) and a surface (32) of the diffuser body (30). The gas can pass from the compartment (50) through the membrane (20) for aeration of fluid in which the diffuser (10) is immersed. The diffuser body surface (32) which bounds the compartment (50) is recessed away from the membrane (20) in use, to contribute to the lateral cross sectional area of the compartment (50) and facilitate distribution of gas along the diffuser by the compartment (50). An automatic purge valve for purging water from a gas feed pipe of a diffuser is also disclosed.

20 Claims, 28 Drawing Sheets

(51) Int. Cl.
*C02F 3/20* (2006.01)
*B01F 101/00* (2022.01)

(52) U.S. Cl.
CPC ............ *B01F 23/231143* (2022.01); *B01F 23/231262* (2022.01); *B01F 23/231265* (2022.01); *B01F 2101/305* (2022.01)

(58) Field of Classification Search
CPC ........ B01F 2003/04404; B01F 3/04269; B01F 2003/04319; B01F 2003/04297; B01F 200/04276; B01F 2003/04312; B01F 3/04255; B01F 2215/0052; B01F 2003/04177; B01F 3/0412; F16K 15/14; F16K 24/06; F16K 15/148; F16K 15/023; C02F 3/201
See application file for complete search history.

(56) References Cited

U.S. PATENT DOCUMENTS

| | | | |
|---|---|---|---|
| 4,243,616 A | 1/1981 | Wyss | |
| 6,406,005 B1 | 6/2002 | Lawson et al. | |
| 2004/0164433 A1* | 8/2004 | Jager | B01F 3/04269 261/122.2 |
| 2010/0224541 A1 | 9/2010 | Takabatake et al. | |
| 2016/0199792 A1* | 7/2016 | Jaeger | B01F 3/04269 261/21 |
| 2017/0210652 A1 | 7/2017 | Frankel et al. | |

FOREIGN PATENT DOCUMENTS

| | | |
|---|---|---|
| DE | 4240300 A1 | 6/1994 |
| DE | 202006003262 U1 | 6/2006 |
| DE | 102012009283 B4 | 2/2016 |
| DE | 202016101743 U1 | 5/2016 |
| GB | 764943 A | 1/1957 |
| GB | 1337110 A | 11/1973 |
| GB | 2537893 * | 11/2016 |
| GB | 2537893 A | 11/2016 |
| JP | 2010274233 A | 12/2010 |
| KR | 890008341 Y1 | 11/1989 |
| KR | 100836814 B1 | 6/2008 |
| KR | 20130032652 A | 4/2013 |

OTHER PUBLICATIONS

Written Opinion of PCT/AU2018/051066, dated Dec. 24, 2018.
Examination Report for Indian Patent Application No. 202027016973, dated Mar. 8, 2022.
European Extended Search Report for European Application No. 18860615.6, dated Jan. 24, 2022.
First Office Action for Chinese Application No. 201880066024.3, dated Oct. 29, 2021.

* cited by examiner

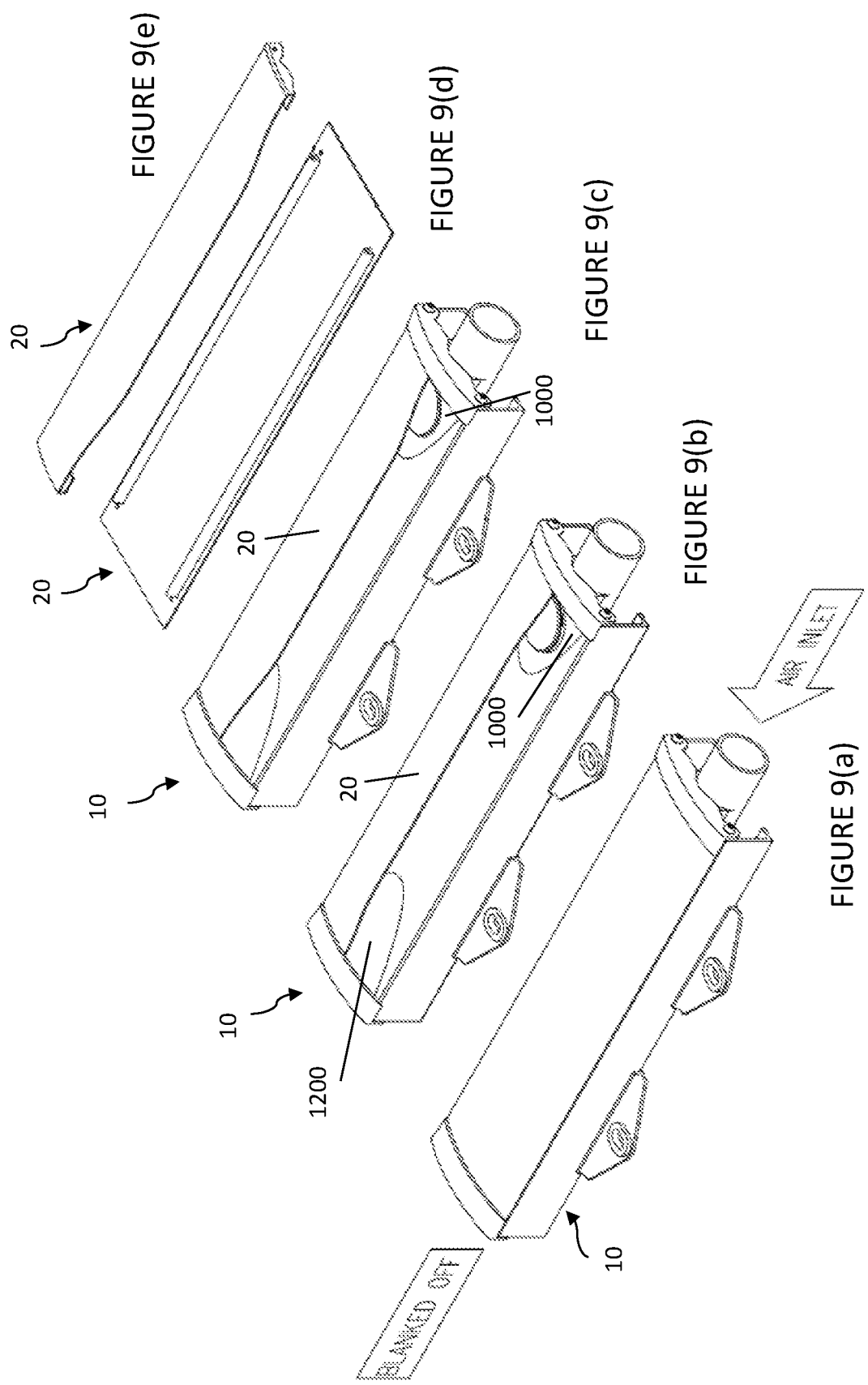

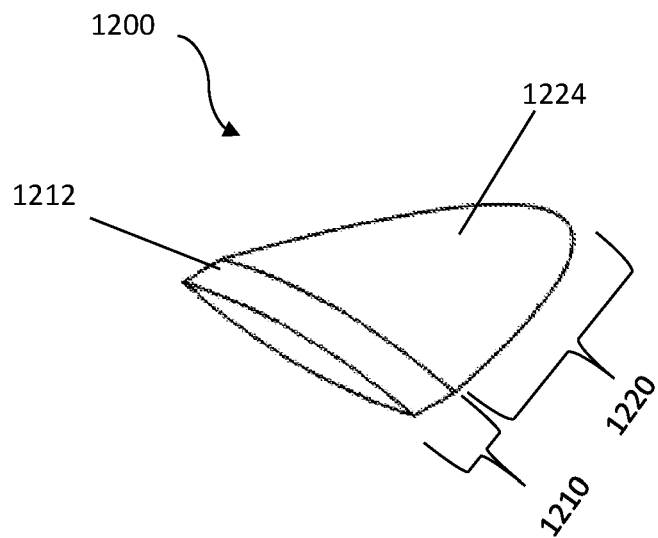
FIGURE 12
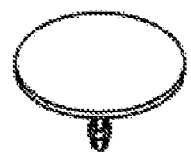
FIGURE 13(b)
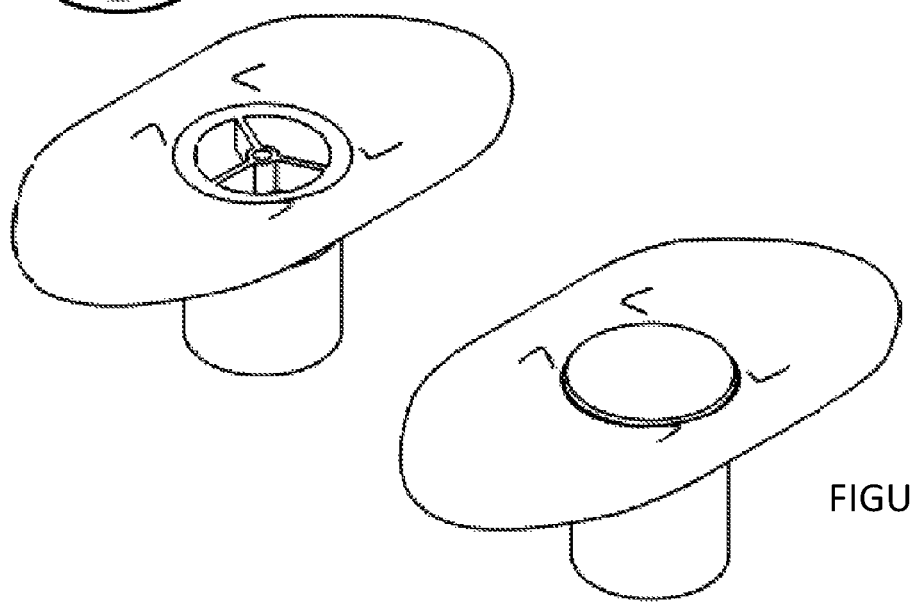
FIGURE 13(a)

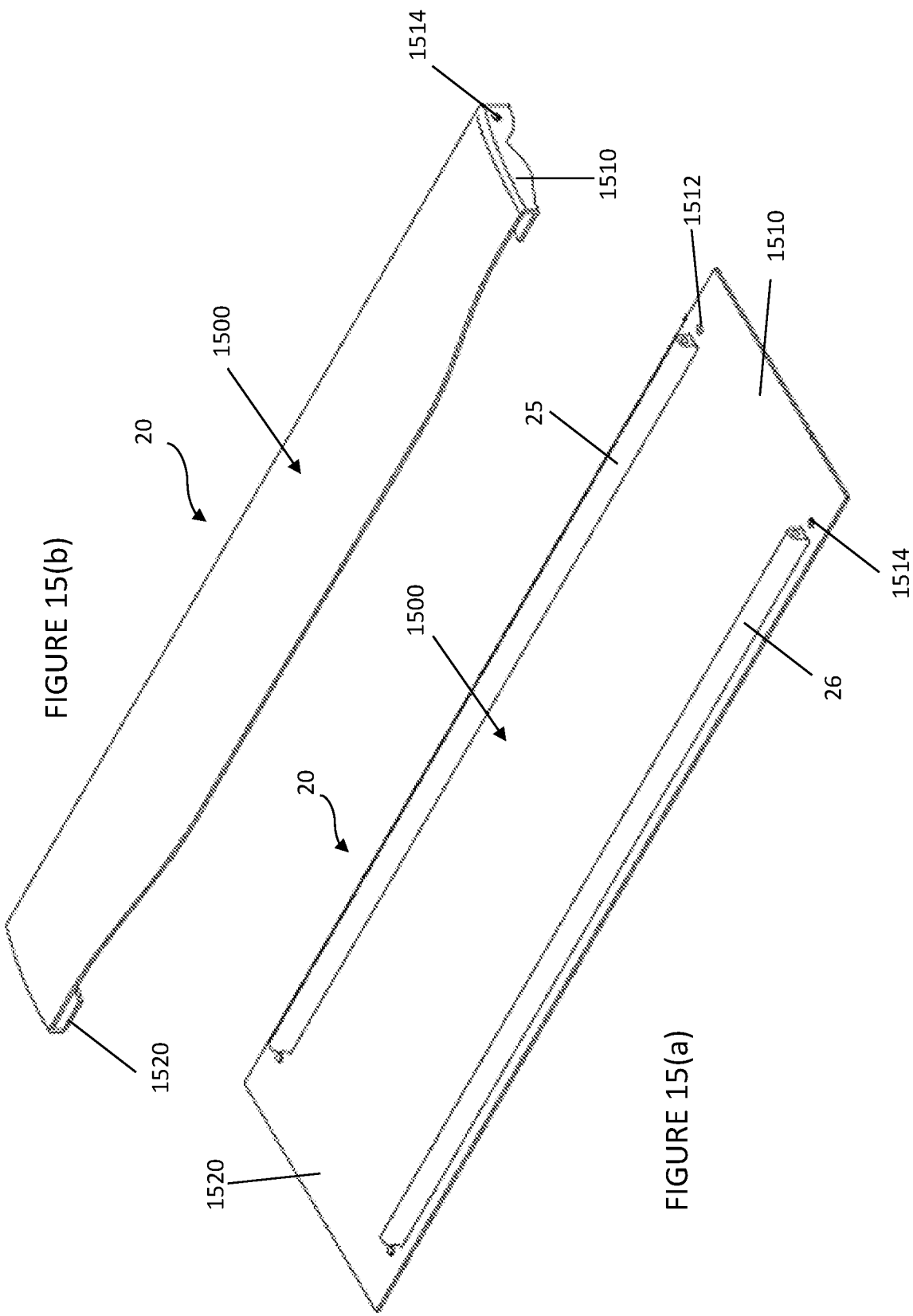

DIFFUSER FOR AERATION OF A FLUID

FIELD

The present disclosure relates to a diffuser for aeration of a fluid. The present disclosure also relates to a purge valve which may be provided in an air feed conduit of the disclosed diffuser.

Definition

In the specification, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

BACKGROUND

In waste water treatment, aeration process supplies oxygen to microbes which consume waste material, thereby aiding its removal from the water. In carrying out this process, aeration diffusers are used to create bubbles from a submerged position in a treatment tank.

One known type of diffuser has a rigid body with an elastomeric membrane fitted to an upper surface of the body. Gas (normally air) is introduced into the diffuser, and passes through small slits in the membrane to form bubbles in the waste water. In use, this type of diffuser provides a small space or void between the upper surface of an upper wall of the body of the diffuser and a lower surface of the membrane, this space being formed by stretching of membrane by the introduction of air, under pressure, between the body and the membrane. When the membrane is stretched, the slits in the membrane open to allow escape of air to form bubbles.

It is known to supply air to a network of submerged diffusers by pipe work which is attached to the floor of the tank or attached to one or more submersible frames which provide weight to counter buoyancy forces which act on the diffusers due largely to the contained air.

Some diffusers are elongate, with lengths substantially greater than their widths. Such diffusers are sometimes called strip diffusers. The membranes of such diffusers typically extend across most of the width and most of the length of the diffuser body.

In a strip diffuser, it is important to supply air to the membrane along substantially the entire length of the diffuser membrane, and to avoid large air pressure differences at different parts of the membrane.

Provision of air to the membrane is addressed in different ways in different diffusers. One type of diffuser is arranged to be mounted to the crown of a pipe and to extend axially parallel to the pipe. Aligned air-feed orifices in the crown of the pipe and in the diffuser body allow air to pass from the pipe interior through the orifices in the crown of the pipe, through orifices in the upper wall of the diffuser body and to the membrane. This type of diffuser thus requires a considerable amount of pipe work in addition to the diffuser itself and, formation of multiple holes which must be formed and aligned, to allow air to pass to each diffuser from the pipe on which the diffuser is mounted. One such diffuser has a length of about two meters, so that a different diffuser must be used for each two meters of diffuser length required.

Another approach to providing air to the membrane along the length of the diffuser is provided by diffusers which do not require mounting along the length of a pipe, but which instead provide an elongate chamber within the diffuser body, so that the diffuser body itself forms a conduit for distributing air along its length. This avoids the need to arrange mounting the entire diffuser atop a pipe and provision and alignment of multiple spaced orifices in the pipe and diffuser body, but requires a diffuser body structure which provides a chamber or conduit along its length. Diffuser bodies of this type are normally limited to about four meters in length.

In both of the types of diffuser described above, one operational issue is that waste water may enter the conduit mixed with liquor that is stagnant and will be a potential problem, for example when removing the diffuser from the tank for maintenance. This can occur whether the conduit is provided by a pipe to which the diffuser body is mounted or by a conduit provided by the diffuser body.

Another problem which occurs in some diffusers is that the sealing of the membrane to the diffuser along the long sides of the diffuser is provided by parts of the diffuser which extend above the edges of the membrane. This can result in a build-up of particulates, such as grit and the like, along the edges of the membrane which is not shed by the raised (inflated) shape the membrane when the diffuser is in use. This has been demonstrated to affect performance and life of the diffusers.

One known type of diffuser produced by Aquatec Maxcon Pty Ltd, an embodiment of which is described in Australian Patent No. 745191, uses an extruded base and extruded or sheet membrane which is sealed along its long edges to the base by insertion of sealing parts into elongate grooves that extend adjacent long edges of the upper surface of the diffuser body. The sealing parts include a thickened part or bulb that resists removal from the grooves and thereby attaches the membrane to the body. The thickened part or bulb may be integrated into the membrane directly or a separate component similar to lengths of spline that are used to attach an insect screen mesh to a frame. At each end of the diffuser, there are further sealing devices to prevent air escape. The upper surface of the diffuser body is flat or convex in transverse cross section (i.e. higher at the centre than at the edges). This diffuser does not include a conduit nor require mounting along the length of a pipe but is generally mounted transverse to a pipe and relies upon the contained space between the upper surface of the diffuser body and the membrane, when the membrane is stretched by applied gas pressure, to allow passage of air from the centre to the ends of the diffuser. This type of diffuser has proven effective in use. However, it has been discerned that an improved, or at least alternative diffuser, is desirable.

The reference to prior art in this specification is not and should not be taken as an acknowledgment or any form of suggestion that the referenced prior art forms part of the common general knowledge in Australia or in any other country.

SUMMARY

According to a first aspect of the present disclosure, there is provided an elongate diffuser comprising:
 a diffuser base comprising a diffuser body;
 a membrane attached to the diffuser body;
 wherein the membrane is connected to the diffuser body so that introduction of gas at a working pressure into the diffuser displaces part of the membrane from contact with the diffuser body to provide an elongate sealed compartment between the membrane and a surface provided mainly or wholly by the diffuser body, the compartment having a first lateral side interface region where the membrane contacts the diffuser body, a laterally intermediate region where the membrane is spaced apart from the diffuser body and a second lateral side interface region where the membrane contacts the diffuser body, and wherein gas can pass from the compartment through the membrane for aeration of a fluid in which the diffuser is immersed; and wherein the diffuser body surface which bounds the compartment comprises a recessed portion which is recessed away from the membrane between the first lateral interface region and the second lateral interface region, compared to a planar surface extending between the first lateral side interface region and the second lateral side interface region, to thereby provide the compartment with larger transverse cross sectional size than would be provided by a planar surface extending from the first lateral side interface region to the second lateral interface region.

In an embodiment, the surface is recessed across at least part of the lateral distance between the first lateral side interface region and the second lateral side interface region.

In an embodiment, the surface is recessed across at least most of the lateral distance between the first lateral side interface region and the second lateral side interface region.

In an embodiment, the surface is recessed across at least 60% of the lateral distance between the first lateral side interface region and the second lateral side interface region.

In an embodiment, the surface is recessed across at least 75% of the lateral distance between the first lateral side interface region and the second lateral side interface region.

In an embodiment, the surface has a substantially uniform curvature across at least most of the lateral distance between the first lateral side interface region and the second lateral side interface region.

In an embodiment, the surface has a substantially uniform curvature across at least 75% the lateral distance between the first lateral side interface region and the second lateral side interface region.

In an embodiment, the surface has a substantially uniform curvature across at least 85% of the lateral distance between the first lateral side interface region and the second lateral side interface region.

In an embodiment, when the diffuser is inactive with substantially no gas pressure applied thereto, the membrane engages the surface of the diffuser body across the recessed region.

In an embodiment, the surface has a substantially concave form in transverse cross section.

In an embodiment, the diffuser provides a gas inlet for introducing gas into the compartment.

In an embodiment, the diffuser provides only a single gas inlet into the compartment.

In an embodiment, the diffuser body does not provide any gas conduit for distributing gas along the length of the diffuser other than the compartment.

In an embodiment, the compartment formed between the diffuser body and the membrane provides the sole or at least primary distribution channel for distributing gas along the length direction of the diffuser.

In an embodiment, the compartment formed between the diffuser body and the membrane provides the only distribution channel for distributing gas along the length direction of the diffuser.

In an embodiment, a gas inlet is provided at a first end region of the diffuser, and the compartment formed between the diffuser body and the membrane provides the primary means of distributing gas from the first end region of the diffuser to the other, second, end region of the diffuser.

In an embodiment, the surface provides no more than one or two inlets for introduction of gas into the compartment.

In an embodiment, a gas inlet is provided at an axially central region of the diffuser body, and the interior compartment distributes gas between the inlet and the axial ends of the interior compartment.

In an embodiment, when the diffuser is oriented so that the first and second lateral side interface regions are horizontally spaced apart, a laterally central region of the surface is the lowest part of the surface.

In an embodiment, the diffuser provides a gas inlet at a first axial end region thereof, and a gas outlet at a second axial end region thereof, so that the interior compartment can be used for distributing gas from a gas supply to another diffuser.

In an embodiment, the diffuser has a length of at least 1 metre.

In an embodiment, the diffuser has a length of at least 5 metres, at least 6 metres, at least 7, at least 8, at least 9, at least 10, or at least 11 metres.

In an embodiment, the diffuser has a length of at least 12 metres.

In an embodiment the diffuser has a length of at between 5 and 7 metres

In an embodiment, the diffuser has a width of between about 8 cm and about 50 cm.

In an embodiment, the diffuser has a width of between about 8 cm and about 30 cm.

In an embodiment, the diffuser has a width of between about 10 cm and about 20 cm.

In an embodiment, the diffuser has a length to width ratio of at least about 12.

In an embodiment, the diffuser has a length to width ratio of at least about 20.

In an embodiment, the diffuser has a length to width ratio of at least about 30.

In embodiment the, diffuser has a length to width ratio of at least about 50.

In an embodiment, the diffuser has a length to width ratio of at least about 70.

When substantially no gas pressure is provided to the diffuser, the membrane may be in a relaxed or collapsed state. In this state, substantially the entire lateral width of the membrane may rest upon the base surface, so that the compartment does not exist.

When a first, lower, level of gas pressure is provided to the diffuser, the membrane may be inflated, but not stretched to provide said compartment, which in this state has a first, smaller, cross-sectional size. That is, the Inflation of the membrane provides said compartment, including said laterally intermediate region of the compartment, where the membrane is spaced apart from the diffuser body.

When a second, higher, level of gas pressure is provided to the diffuser, the membrane may be inflated, and also stretched, to increase the spacing between the membrane and the diffuser body at the laterally intermediate region of the compartment, so that in this state the compartment has a second, greater cross-sectional size.

In an embodiment, at least one axial end region the membrane is sealed against a surface of the diffuser base.

In an embodiment, at least one axial end region the membrane is sealed against a surface of the diffuser base such that a transversely extending region of the membrane is retained in a substantially convex cross sectional shape.

In an embodiment, at least one axial end region the membrane is sealed against a surface of the diffuser base such that a transversely extending region of the membrane is retained in a substantially convex cross sectional shape irrespective of whether the membrane is inflated.

In an embodiment, at least one axial end region the membrane is sealed against a surface of the diffuser base such that a transversely extending region of the membrane is retained in a substantially convex cross sectional shape which corresponds substantially to the cross sectional shape of a corresponding lateral region of the membrane, at an axially central region of the diffuser, when the membrane is inflated.

In an embodiment, at least one axial end region the membrane is sealed against a surface of the diffuser base such that a transversely extending region of the membrane is retained in a substantially convex cross sectional shape which corresponds substantially to the cross sectional shape of a corresponding lateral region of the membrane, at an axially central region of the diffuser, when the membrane is inflated but not stretched.

In an embodiment, at least one axial end region of the interior compartment is at least partially defined by a base surface end portion which is shaped to provide a smooth transition from a transverse cross sectional shape that is substantially convex closer to the corresponding end of the diffuser to a transverse cross sectional shape that is recessed closer to an axial centre of the diffuser.

In an embodiment, the base surface end portion is shaped to allow the membrane, when substantially no gas pressure is provided and the membrane is resting upon the base surface, to smoothly transition from a substantially convex cross sectional shape closer to the end of the diffuser, to a recessed cross sectional shape closer to an axial centre of the diffuser.

In an embodiment, the substantially convex cross sectional shape of the base surface end portion corresponds to the cross sectional shape of the membrane at an axially central region of the diffuser, when the membrane is inflated.

In an embodiment, the substantially convex cross sectional shape of the base surface end portion corresponds to the cross sectional shape of the membrane at an axially central region of the diffuser, when the membrane is inflated but not stretched.

In an embodiment, the recessed cross sectional shape of the base surface along at least a substantial part of its axial length, corresponds generally to a mirror image of the cross sectional shape of the membrane at an axially central region of the diffuser, when the membrane is inflated but not stretched.

In an embodiment, at least one base surface end portion is provided by an end piece component manufactured separately to the diffuser body, and the diffuser base comprises said diffuser body and said at least one end piece component.

In an embodiment, at least one end piece component provides a blocking region which at least partially blocks a recess provided by the recessed portion of the diffuser body, at an end region of the diffuser.

In an embodiment, at least one base surface end portion is provided by a shaped surface of the diffuser body.

In an embodiment, the diffuser comprises a gas inlet for passage of gas into the compartment.

In an embodiment, at least one base surface end portion provides said gas inlet.

In an embodiment, at least one end piece component provides said gas inlet.

In an embodiment, the diffuser comprises a non-return valve associated with the gas inlet.

The non-return valve may be adapted to prevent or mitigate flow of liquid which enters the cavity into the gas inlet.

In an embodiment, the diffuser comprises a fail-closed valve associated with the gas inlet.

In an embodiment, the diffuser body is substantial uniform in cross section.

In an embodiment, the diffuser body is pultruded or extruded.

In an embodiment, the diffuser body is manufactured wholly or primarily from plastic, fibre reinforced or glass reinforced plastic, or metal.

In an embodiment, the diffuser body underside provides a single open channel structure.

In an embodiment, the diffuser body underside is substantially free from additional lateral supports or webs.

In an embodiment, the diffuser is a fine bubble diffuser.

In an embodiment, the diffuser is provided with a mounting plate for mounting the diffuser to a support.

In an embodiment, the mounting plate comprises two mounting plate parts which can be connected to provide the mounting plate.

In an embodiment, each of the two mounting plate parts can, when separated from the other, be operatively engaged with the diffuser body at substantially any desired axial position along the length of the diffuser body but when connected together can only be disengaged from the diffuser body at predefined axial positions.

In an embodiment, the predefined axial positions are the ends of the diffuser.

In an embodiment, each mounting plate part provides an engagement formation for engaging a first side part of the diffuser.

In an embodiment, each mounting plate part provides a transversely extending portion which extends in use from the side of the diffuser engaged by the mounting plate part towards the other lateral side of the diffuser.

In an embodiment, each transversely extending portion is dimensioned to extend more than half the distance between the engaged side portions of the diffuser, but less than the full distance between the engaged side portions of the diffuser.

In an embodiment, when the mounting plate parts are not connected, neither extends across the full distance between the engaged side portions of the diffuser, but when they are connected the combined two-part mounting plate extends between the engaged side portions of the diffuser and can thereby be retained in a fixed position relative to the diffuser.

In an embodiment, each mounting plate part provides a connection formation for connecting with a connection formation of the other mounting plate part.

In an embodiment, the engagement formation restricts movement of the mounting plate part relative to the diffuser in the transverse direction of the diffuser and allows sliding of the mounting plate part in the axial direction of the diffuser.

In an embodiment, the two mounting plate parts are substantially identical.

According to a second aspect of the present disclosure, there is provided an elongate diffuser comprising:
 a diffuser base comprising a diffuser body;
 a membrane attached to the diffuser body;
 wherein the membrane is connected to the diffuser body so that introduction of gas at a working pressure into the diffuser displaces part of the membrane from contact with the diffuser body to provide an elongate sealed compartment between the membrane and a surface provided mainly or wholly by the diffuser body, and wherein gas can pass from the compartment through the membrane for aeration of a fluid in which the diffuser is immersed; and wherein the diffuser body surface which bounds the compartment comprises a recessed portion which is recessed away from the membrane in use, and which contributes to the lateral cross sectional area of the compartment, to thereby facilitate distribution of gas along at least a substantial part of the length of the diffuser by the compartment.

In an embodiment, the compartment has a first lateral side interface region where the membrane contacts the diffuser body, a laterally intermediate region where the membrane is spaced apart from the diffuser body and a second lateral side interface region where the membrane contacts the diffuser body.

In an embodiment, the shape of the diffuser body surface provides the compartment with larger transverse cross sectional size than would be provided by a planar diffuser body surface extending between the first lateral side interface region and the second lateral side interface region.

According to a third aspect of the present disclosure, there is provided an elongate diffuser comprising:
  a diffuser base comprising a diffuser body;
  a membrane attached to the diffuser body;
  wherein the membrane is connected to the diffuser body so that introduction of gas at a working pressure into the diffuser displaces part of the membrane from contact with the diffuser body to provide an elongate sealed compartment between the membrane and a surface provided mainly or wholly by the diffuser body; and
  wherein the diffuser body and membrane are dimensioned and configured so that said compartment can be formed without substantial stretching of the membrane.

According to a fourth aspect of the present disclosure, there is provided a method of operating a diffuser to aerate a liquid comprising:
  providing a diffuser in a body of liquid, the diffuser comprising a diffuser base and a membrane, wherein the membrane fits substantially unstressed on the base when no air gas pressure is provided to the diffuser;
  operating the diffuser with a first lower level of gas pressure applied to flex the membrane and displace at least some of the membrane away from the base, to thereby form an interior compartment between the membrane and the base which acts as a conduit to distribute gas over a substantial part of the length of the diffuser, without substantially stretching the membrane; and
  after formation of the interior compartment along substantially the working length of the diffuser, operating the diffuser with a second, greater, level of gas pressure, sufficient to stretch the membrane, to thereby open slits or apertures therein for formation of bubbles in the body of liquid.

In an embodiment, the method comprises use of a diffuser in accordance with the first aspect.

In an embodiment, the method comprises use of a diffuser in accordance with the second aspect.

In an embodiment, the method comprises use of a diffuser in accordance with the third aspect.

In an embodiment, operating the diffuser with a first lower level of gas pressure applied comprises operating the diffuser with at a gas pressure of marginally greater than the fluid pressure immediately adjacent the diffuser.

In an embodiment, operating the diffuser with a second, greater, level of gas pressure applied comprises operating the diffuser with at a gas pressure of at least 2 kPa greater than the fluid pressure immediately adjacent the diffuser.

In an embodiment, operating the diffuser with a second, greater, level of gas pressure applied comprises operating the diffuser with at a gas pressure of between 2 and 10 kPa greater than the fluid pressure immediately adjacent the diffuser.

According to a fifth aspect of the present disclosure, there is provided a purge valve system for use in an air inlet pipe of an air diffuser, comprising:
  a purge control element movable between a first control position for closing a water outlet when there is little or no accumulated water to be purged, and a second control position for opening the outlet in response to the presence of water to be purged; and
  a flow check valve through which water is, in use, purged, said flow check valve being a one-way valve which allows flow of water therethrough in the purging direction and in use substantially prevents flow of water therethrough in the reverse direction.

In an embodiment the flow check valve is provided downstream, in a water purge flow direction, of the water outlet.

In an embodiment the purge control element comprises a float.

In an embodiment the first control position corresponds to a non-floating position of the float.

In an embodiment the water outlet comprises a seat engageable by the float.

In an embodiment the water outlet comprises an inlet part of the flow check valve.

In an embodiment the second control position corresponds to a floating position of the float.

In an embodiment the flow check valve comprises a flexible part which is deformable by positive net fluid pressure on an upstream side thereof, in a water purge flow direction, into an open configuration.

In an embodiment the flexible part of the flow check valve is configured to remain in a substantially closed configuration in the circumstances of positive net fluid pressure on a downstream side thereof, in a water purge flow direction.

In an embodiment the flexible part of the flow check valve comprises an elastomer material.

In an embodiment the elastomer material is a type of rubber.

In an embodiment the flow check valve is configured to provide a slot which is closed in the absence of net pressure from either side of the flow check valve.

In an embodiment the flow check valve is configured so that the slot remains closed in the presence of a positive net pressure applied to a downstream side thereof, in a water purge flow direction.

In an embodiment the flow check valve is configured to provide a slot which is configured to be forced open by a positive net pressure applied to an upstream side thereof, in a water purge flow direction.

In an embodiment the slot is provided by two opposed parts of the flow check valve.

In an embodiment the flow check valve comprises a duck-bill valve.

In an embodiment, the purge valve system comprises a float restraining member positionable in a first, float restraining, position to retain the float substantially in the first, non-floating, position.

In an embodiment the float restraining member is moveable by providing increased air pressure in a vessel from which water is to be purged.

In an embodiment the float restraining member is moveable by providing increased air pressure in the air inlet pipe from which water is to be purged.

Any one or more features and/or characteristics described in relation to the first aspect may be incorporated mutatis mutandis in the diffuser of the second aspect, the diffuser of the third aspect and/or into the method of the fourth aspect.

Any one or more features and/or characteristics described in relation to the fifth aspect may be incorporated mutatis mutandis in the diffuser of the first aspect, the diffuser of the second aspect, the diffuser of the third aspect and/or into the method of the fourth aspect.

According to a sixth aspect of the present disclosure, there is provided an air shut off valve for use in an air inlet pipe of an air diffuser, the air shut off valve being adapted to shut off air flow to the diffuser in event of failure of an air diffusion membrane, the air shut off valve comprising: a valve member adapted to remain in an open, inoperative, position when air flow to the diffuser is below a threshold level, to move into a closed, shut-off, position in response to the air flow exceeding the threshold level and, after movement into the closed position, to remain in the closed position despite the air flow level dropping to below the threshold level.

BRIEF DESCRIPTION OF THE DRAWINGS

Embodiments will be described below, in detail, with reference to accompanying drawings. The primary purpose of this detailed description is to instruct persons having an interest in the subject matter of the invention how to carry the invention into practical effect. However, it is to be clearly understood that the specific nature of this detailed description should not be considered to supersede the generality of the preceding Summary section or appended claims. In the accompanying diagrammatic drawings:

FIG. 9(a) is a schematic perspective view of the diffuser of FIGS. 6 to 8;

FIG. 9(b) is a schematic perspective view of the diffuser of FIGS. 6 to 8, with the elastomeric membrane fully inflated and partially cut away to show internal structure;

FIG. 9(c) is a schematic perspective view of the diffuser of FIGS. 6 to 8 with the elastomeric membrane relaxed (fully deflated) and partially cut away to show internal structure;

FIG. 9(d) is a schematic perspective view of an elastomeric membrane tailored for use with the diffuser of FIGS. 6 to 9(c);

FIG. 9(e) is a partially cut away schematic perspective view of the elastomeric membrane in isolation but showing an example shape of an end region thereof when fitted to a diffuser as shown in FIGS. 6 to 9(c);

FIG. 12 is a schematic perspective view of a tapered end component which does not include an air inlet;

FIG. 13(a) is schematic perspective view of an air inlet component for use in an axially central region of a diffuser;

FIG. 13(b) is an exploded view of the air inlet component of FIG. 13(a);

FIG. 15(a) is an enlarged view of FIG. 9(d);

FIG. 15(b) is an enlarged view of FIG. 9(e);

DETAILED DESCRIPTION OF THE EMBODIMENTS

With reference to the accompanying drawings, embodiments of diffusers for aeration of a fluid will now be described.

With reference to FIGS. 1 to 5, an embodiment of a diffuser in accordance with the present disclosure, generally designated 10, comprises a flexible member 20 which may be an elastomeric membrane, and a diffuser base body 30.

Figure 1A:
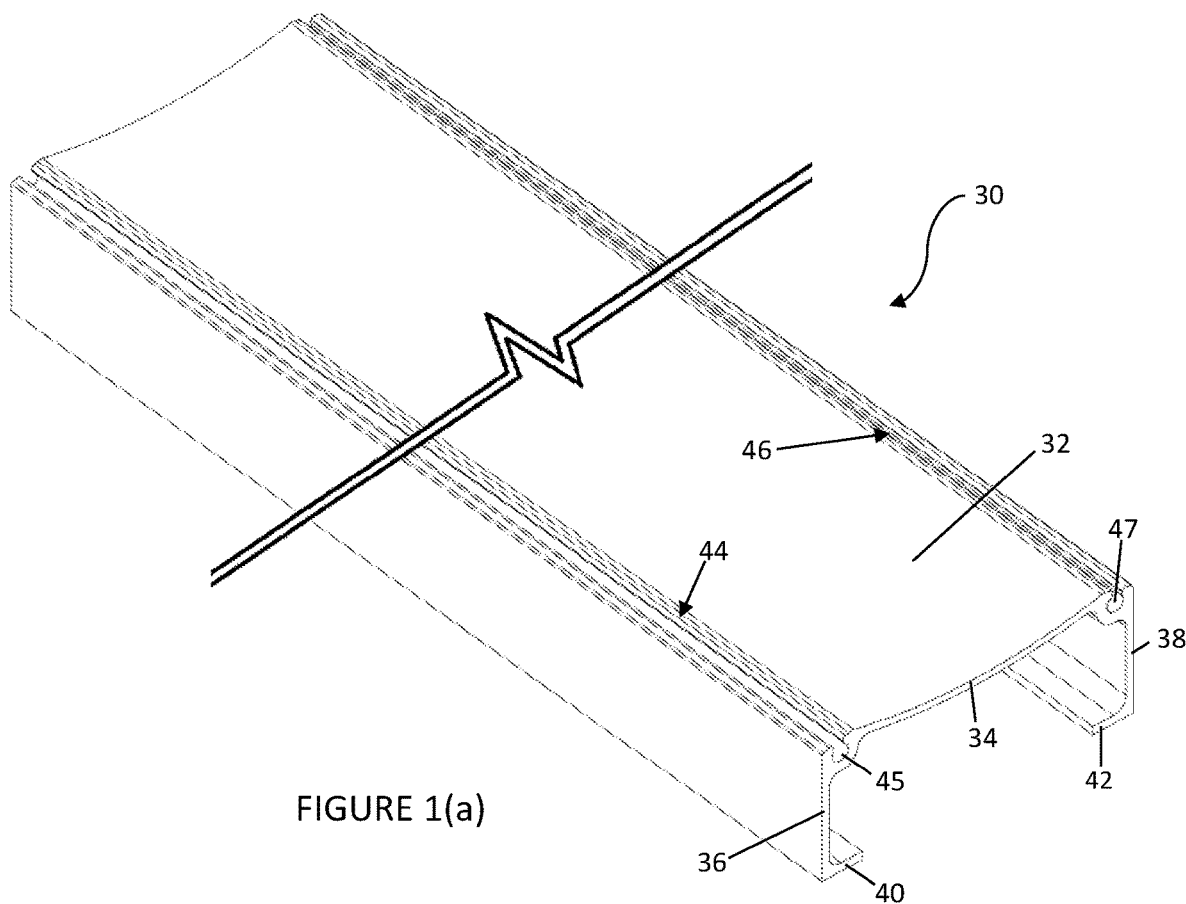
FIG. 1(a) is a perspective view of a base part of a diffuser for aeration of a fluid in accordance with an embodiment of the present disclosure.
Figure 1B:
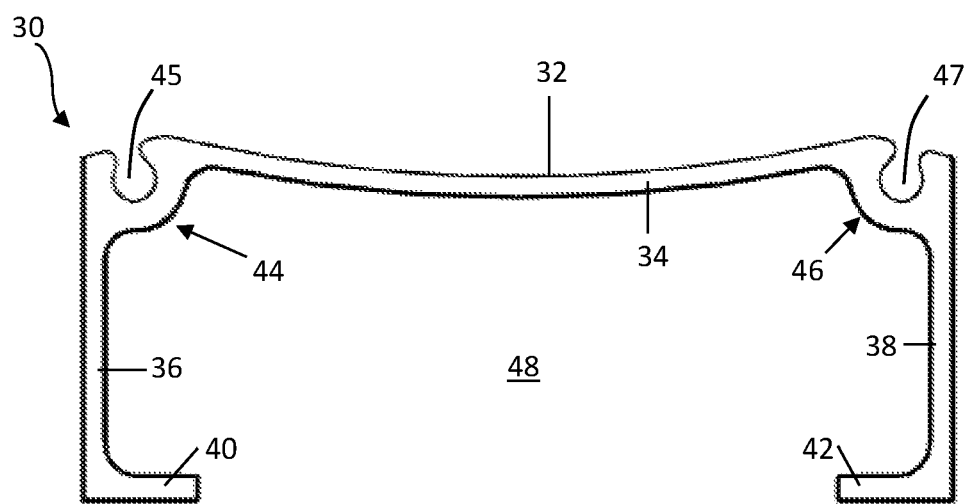
FIG. 1(b) is a cross sectional view of the diffuser base part of FIG. 1(a) diffuser.

As illustrated in FIGS. 1(a) and 1(b) (referred to collectively as FIG. 1), the diffuser base body 30 in this embodiment comprises a main surface 32, which is, in normal use, upwardly facing. The main surface 32 is provided on an in-use upper wall 34 of the diffuser base body 30. The main surface 32 is recessed in an in-use downwards direction. In this embodiment, at least part of the main surface 32 is curved so that at least some of the main surface is lower than it would be if the main surface were planar. In this embodiment at least part of the main surface the 32 is part cylindrical, although it should be appreciated that other geometries of curvature could be used. Similarly, in this embodiment, at least part of the in-use upper wall 34 is part cylindrical. The diffuser base body 30 may be pultruded or extruded using plastic, fibre reinforced or glass reinforced plastic or metal such as aluminium. It could also be roll formed from metal material such as stainless steel or even 3D printed. The break lines in FIG. 1(a) are intended to indicate that the base can be cut, or otherwise manufactured to substantially any manageable length.

The diffuser base body 30 further comprises first and second side walls 36, 38 on which the upper wall 34 is supported in use. In this embodiment, the first and second side walls 36, 38 are substantially parallel and are laterally spaced apart by the upper wall 34.

Depending from a bottom region of each of the first and second side walls 36, 38 is a respective inwardly directed flange wall 40, 42.

The diffuser base body 30 further comprises first and second attachment regions 44, 46 for attachment of the flexible member 20 to the diffuser base body 30. In this embodiment, the attachment regions 44, 46 are provided substantially where the upper wall 34 meets the first and second side walls 36, 38 but it will be appreciated that in other embodiments, they could be provided wholly on the upper wall 34 or wholly on the first and second side walls 36, 38.

Each of the first and second attachment regions 44, 46 defines a corresponding groove 45, 47 for receiving a sealing strip 25, 26 of the flexible member 20 illustrated in FIG. 2 (which will be described further below).

The diffuser base body 30 may be regarded as being of generally rectangular cross section defining an interior channel 48, which is open at the bottom of the diffuser base body 30, as the laterally inward ends of the inwardly directed flange walls 40, 42 are spaced apart. However, the main surface 32, and in this embodiment the in-use upper wall 34, is recessed towards the centre of the channel 48. Further, the first and second attachment regions 44, 46 depart from a rectangular shape. Of course, alternative embodiments may be differently shaped without departing from the scope of the present disclosure.

Figure 2:
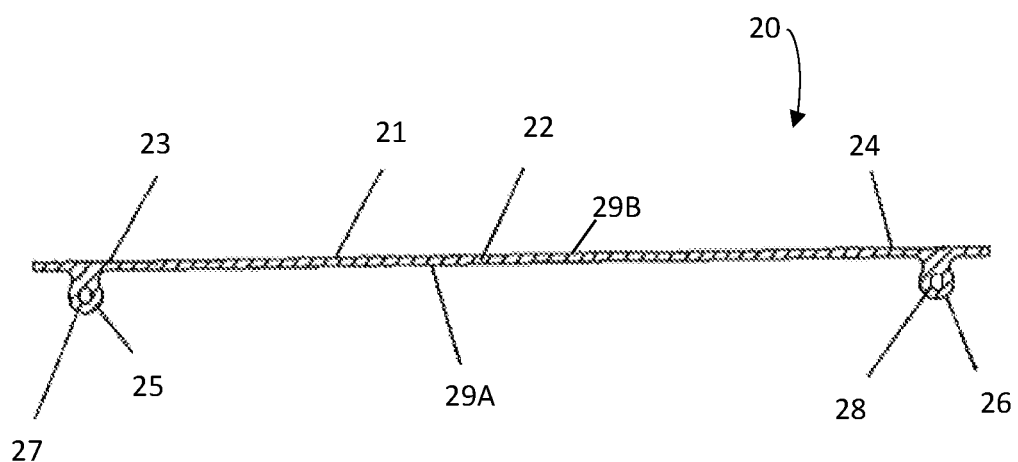
FIG. 2 is a is a cross sectional view of an elastomeric membrane for use with the base shown in FIG. 1.

As illustrated in FIG. 2, the flexible member 20 comprises a sheet of flexible material 21 dimensioned to fit upon the diffuser base body 30. The flexible member 20 has a generally laterally central region 22 and first and second lateral side regions 23, 24. Provided at or adjacent the side regions 23, 24 are respective first and second sealing strips 25, 26, which extend along the side regions 23, 24 in the length direction of the flexible member 20. In this embodiment, the sealing strips 25, 26 are in the form of deformable projections which, in this embodiment, widen as they project further from the sheet of flexible material 21 to facilitate retention in the groove 45, 47 and may be regarded as bulbous in form. In this embodiment, a wider part of each sealing strip 25, 26 has an internal void or passageway 27, 28 which extends along the sealing strip. The internal passageways may assist deformation of the sealing strips, and thus insertion into the grooves 45, 47, but are not necessary in all embodiments.

The flexible member 20 may be regarded as having an in-use internal face 29A and an in-use external face 29B, with the sealing strips 25, 26 projecting from the internal face 29A.

The flexible member 20 may be formed by extrusion, with the sealing strips 25, 26 integrally formed therein. Other embodiments may provide sealing strips formed separately to membrane, for example, providing a sheet membrane and separate sealing strips which may be forced into grooves of the diffuser body in order to retain lateral edges of the sheet in the grooves, for example, in a manner corresponding to the way splines are used to retain edge regions of sheets of fly screen material frames provided for use in door or window openings.

Figure 3:
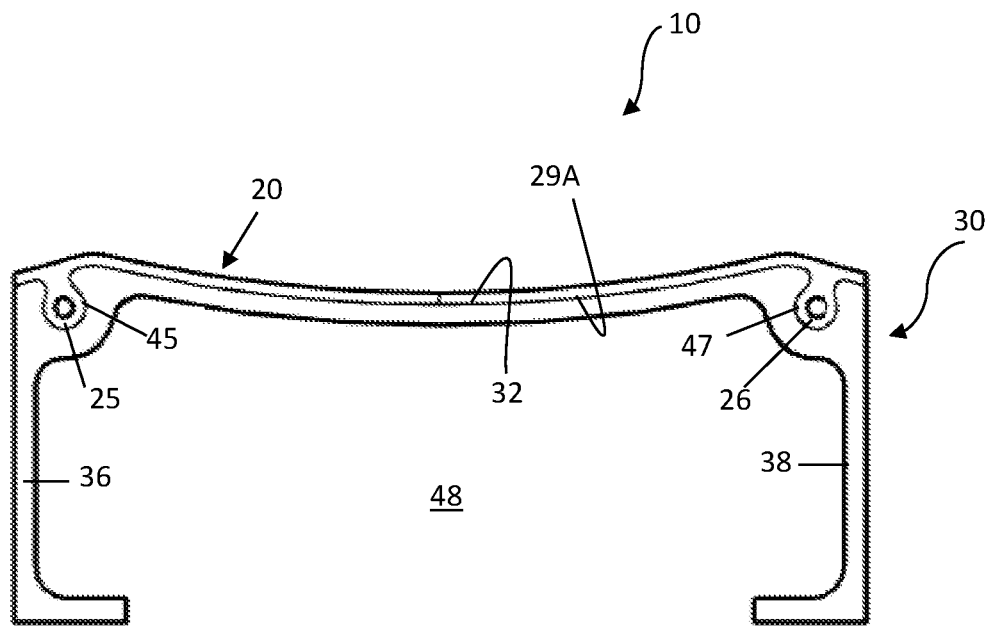
FIG. 3 is a schematic cross sectional view illustrating the configuration of a diffuser comprising the base part of FIG. 1 and the elastomeric membrane of FIG. 2 when no air is being supplied to the diffuser.

FIG. 3 illustrates, in transverse cross section, the diffuser 10 assembled for use, and with the flexible member 20 overlaid on the main surface 32 of the diffuser base body 30. The sealing strips 25, 26 are retained in the grooves 45, 47.

It will be understood that wider parts of the sealing strips 25, 26 are deformable such that they compress when forced through the relatively narrow openings of grooves 45, 47 and then expand to press against the inner surface of the grooves, to thereby provide a sealed connection of the flexible member 20 to the diffuser base body 30. Moreover, sealing strips 5 and grooves 4 are dimensioned such that the sealing strips are held within the grooves once the flexible member 20 has been fitted to the diffuser base body 30. The retention and/or sealing of the sealing strips 25, 26 in the grooves 45, 47 may, if desired, be enhanced by inserting one or more substantially incompressible members (such as solid rod or wire), or by application of a fluid which subsequently cures to become substantially solid, into the internal voids or passageways 27, 28 or by application of a of sealant material suitable to adhere to both the flexible member 20 to the diffuser base body 30.

This connection of the flexible member 20 to the diffuser base body 30 provides an effective seal along the lateral sides of the diffuser 10. It should be appreciated that the diffuser 10 may be many metres long, as will be described in more detail in due course. (It will be appreciated that there is a need to provide a seal between the flexible member 20 and the diffuser base body 30 at the ends, as well as along the lateral sides, and also to provide ingress of air into the diffuser, and these aspects will be described in due course.)

The configuration illustrated in FIG. 3 corresponds to a condition in which there is substantially no gas pressure applied to the diffuser 10. Substantially the entire width of the flexible member 20 is in contact with the main surface 32 of the diffuser base body 30. The flexible member 20 is relaxed and not stretched. The flexible member 20 is provided with small slits or other apertures to allow air to pass from the interior side 29A to the exterior side 29B, to allow bubble formation. In the relaxed and unstretched condition of the flexible member 20, these apertures are substantially closed. Thus, in this condition, the flexible member 20 lies smoothly along the main surface 32 of the diffuser base body 30 without open slits or apertures, so that it effectively prevents ingress of waste water (or other liquid in which the diffuser 10 is immersed) to prevent ingress of liquid into the diffuser or into associated pipework via the diffuser. To achieve this, It is important to have the flexible member 20 accurately dimensioned for the diffuser: if the flexible member 20 is too loose the excess material will likely cause it to crease and split, and if the flexible member 20 is too taut, the slits will open without application of air to stretch it, likely allowing unintended and undesirable ingress of liquid. To help ensure an appropriate dimensional fit throughout the life of the flexible member 20, it is important to provide a flexible member 20 which will provide minimal creep during its operational life.

Figure 4:
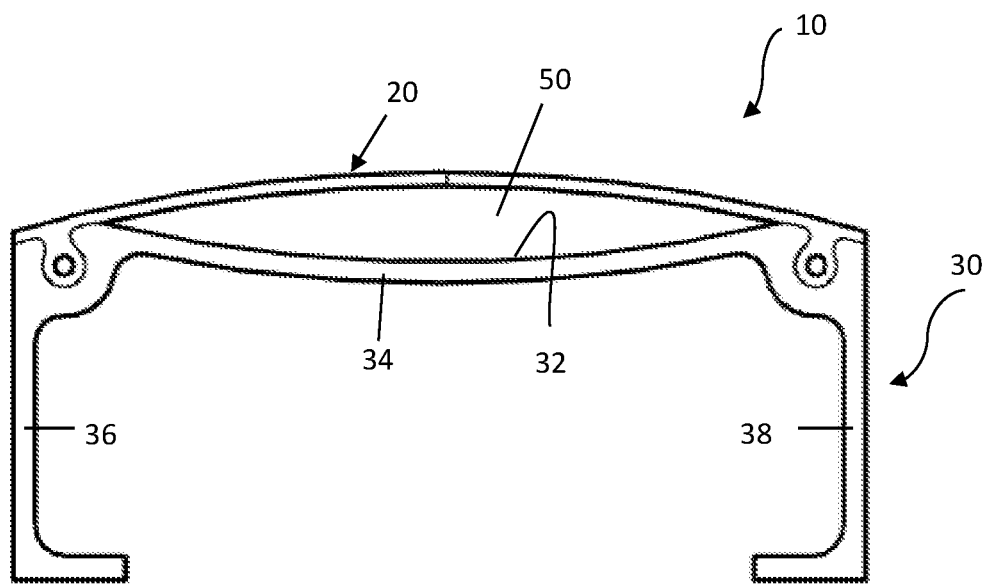
FIG. 4 is a schematic cross sectional view illustrating the configuration of the diffuser of FIG. 3 when sufficient air is provided to raise part of the elastomeric membrane but not to substantially stretch it.

FIG. 4 illustrates, in transverse cross section, the assembled diffuser 10, and the configuration illustrated in FIG. 4 corresponds to a condition in which there is sufficient gas pressure applied to the diffuser 10 to cause the flexible member 20 to flex and to inflate, but not to substantially stretch. The inflation of the flexible member 20 creates a gas-filled interior compartment 50 between the flexible member 20 and the main surface 32 of the diffuser base body 30, which effectively forms a pipe or conduit which can distribute air along the length of the diffuser 10. This pipe or conduit is formed without stretching or stressing of the flexible member 20 or opening of the apertures or slits therein. The cross sectional size of the interior compartment 50, and thus the capacity of the pipe or conduit which it forms, can then be increased by increasing the applied gas pressure, as will be described below. The action of inflating the flexible member 20 to a convex profile as shown in FIG. 4 promotes the removal of any debris which may settle on the membrane during non-operating time such as in an intermittent aeration application (e.g. in Sequential Batch Reactors (SBR) or Intermittently Decanted Extended Aeration (IDEA)).

Figure 5:
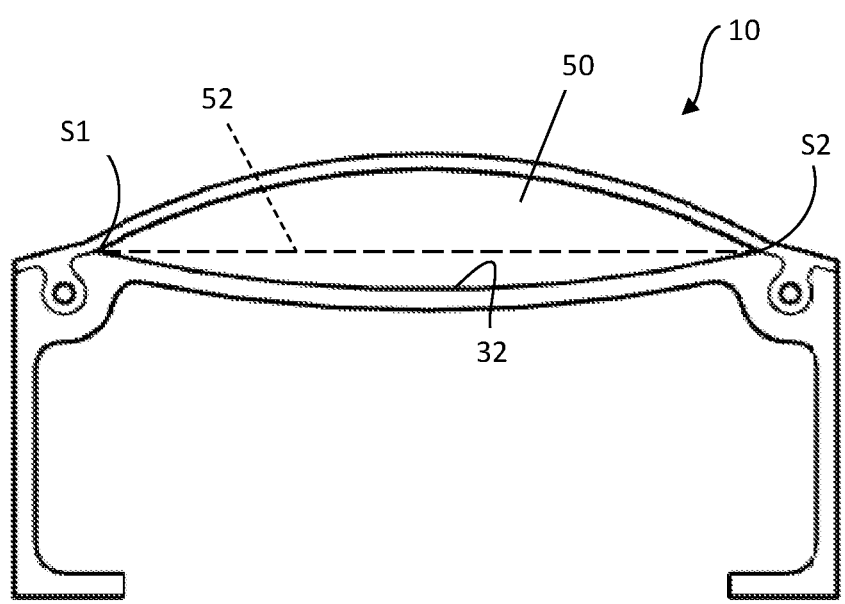
FIG. 5 is a schematic cross sectional view illustrating the configuration of the diffuser of FIG. 3 when sufficient air is provided to stretch the elastomeric membrane and operate the diffuser.

FIG. 5 illustrates, in transverse cross section, the assembled diffuser 10, with a configuration corresponding to a working condition, in which there is sufficient gas pressure applied to the diffuser 10 to cause the flexible member 20 to stretch, so that the perforations or slits open and air can pass therethrough and form bubbles in the liquid in which the diffuser 10 is immersed.

The increased applied gas pressure, compared to the condition of FIG. 4, causes stretching of the flexible member 20, which increases the cross sectional size of the size of the interior compartment 50, and thus the capacity of the pipe or conduit which it forms.

It will be appreciated that the pipe or conduit or conduit formed by the interior compartment 50 is relied upon for distribution of gas/air along the length of the diffuser 10. No other pipe or conduit structure is provided by the diffuser 10 between its ends, and no other pipe relied upon for distributing gas between the ends of the diffuser.

It will further be appreciated that the recessed shape of the main surface 32 plays an important role.

The interior compartment 50 is provided by the inflated (and/or) stretched flexible member 20, and the main surface 32. At either lateral side of the compartment 50, the compartment is bounded by a lateral side which may be regarded as the most inward point of contact between the flexible member 20, and the main surface 32. These lateral sides are designated S1 and S2 in FIG. 5. By way of illustration of the recessed nature of the main surface 32, a straight line between S1 and S2 is included in FIG. 5, shown as a dashed line 52. From comparison of the dashed line 52 and the main surface 32, it can be seen that the recessed shape of the main surface 32 substantially increases the cross sectional size of the interior compartment, compared to use of a straight or planar surface extending between the lateral sides S1, S2 of the interior compartment 50.

Further, the initial formation of an interior compartment 50 which effectively forms a pipe or conduit, without stretching of the flexible member 20, by applying a relatively low air pressure, and then incremental increase in gas pressure to stretch the flexible member 20 to increase the size of the pipe or conduit which it provides, help avoid deformation or creasing of the flexible member 20 which might damage it, and thereby assist in providing a flexible member 20 with a long working life. In the described embodiment, features of the diffuser 10 at or adjacent the ends of the diffuser, which will be described hereafter, also contribute to avoiding application of undue stresses to the flexible member 20.

The flexible member inflates (without substantial stretching) at any pressure greater than the surrounding fluid pressure (but insufficient to substantially stretch the flexible member).

The flexible member stretches, and the diffuser diffuses air, at pressures ranging from approximately 2 kPa to approximately 15 kPa above the surrounding fluid pressure, depending on the air flux and condition of the diffuser, for example, as a result of fouling from precipitates and biological films.

The formation of the compartment between the unstretched flexible member and the base enables air to be distributed over considerable axial lengths of diffuser before the flexible member is required to stretch. This effectively provides an axially extending conduit, formed between the flexible member and the base, so that it is not necessary to provide a separately formed conduit (such as an enclosed conduit formed in or below the base) for distributing the gas along substantial lengths of diffuser.

By way of comparison with diffusers of the type disclosed in Australian Patent No. 745191 (to Aquatec Maxcon), in which stretching of the flexible member (membrane) is required to provide a compartment between the flexible member and the base so that the compartment can act as a conduit, attempts to distribute gas along lengths similar to those achievable by diffusers in accordance with the present disclosure resulted in the membrane becoming unstable and fluttering (oscillating rapidly and erratically) causing the air distribution to be poor and the membrane to fatigue rapidly.

In a particular embodiment of the diffuser base body 30, the width of the diffuser base body 30 is about 15.5 cm. A radius of curvature of the recessed surface 32 (which in this embodiment is part-cylindrical) is about twice the width of the diffuser base body 30. The wall thicknesses are mostly about 3-4 mm (although wall thicknesses are greater in some areas, such as adjacent the grooves 46, 47). Of course, alternative dimensions and shapes could be used, including much thinner material, as little as 1 mm in thickness.

FIGS. 6 to 9(*c*) illustrate a practical embodiment of a diffuser in accordance with the present disclosure. As the embodiment of FIGS. 6 to 9(*c*) is consistent with the schematic cross sectional views of FIGS. 3 to 5, corresponding reference numerals are used. It will be understood that the schematic cross sectional views of FIGS. 3 to 5 do not show components of the diffuser 10 other than the flexible member 20 and the diffuser base body 30, but that FIGS. 6 to 9(*c*) do include additional components.

It should be appreciated that although illustrated as being fairly axially short for ease of illustration, the illustrated diffuser 10 may be very large in axial length compared to its lateral width. By way of example, in one successfully tested embodiment, the width of the diffuser 10 is approximately 15.5 cm, and the length approximately 12 metres, so that the length is approximately 75 times the width. Practical embodiments may be limited to about 6 metres in length for ease of transportation, although greater lengths, probably up to about 12 metres may be practicable under some circumstances.

Figure 6:
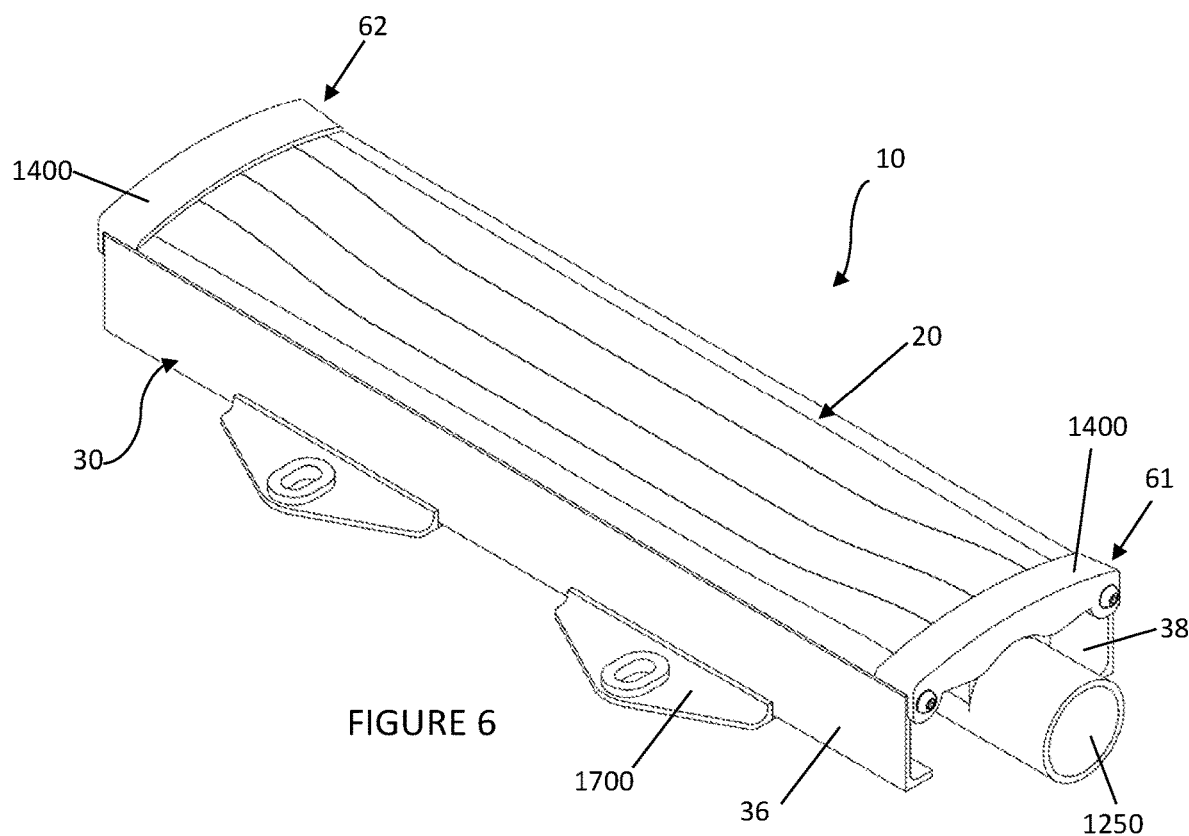
FIG. 6 is a schematic perspective view of an embodiment of a diffuser, consistent with FIGS. 1 to 5, when no air is being supplied to the diffuser.

FIG. 6 illustrates in schematic perspective view, the diffuser 10 in a condition in which there is no air flow. The flexible member 20 is in contact with the recessed main surface 32 along most of the length of the diffuser 10, corresponding to the configuration illustrated in FIG. 3. However, it should be noted that at the ends 60, 61 of the diffuser 10, the end regions of the flexible member 20 are retained and sealed by retaining clamps 1400 in a cross sectional shape substantially corresponding to the inflated but not stretched shape of the flexible member 20 illustrated in FIG. 4, that is, with laterally central region 22 of the flexible member 20 extending outwardly (which in this embodiment corresponds to an upwards direction) beyond the side regions 23, 24. Further, the flexible member 20 transitions between the end (convex) and axially central (concave) shapes smoothly and fairly gradually. In an embodiment, this gradual transition is facilitated by shaped end pieces (1000, 1200, but not shown in FIG. 6) which will be described in due course. The gradual transition in shape of the supported flexible member is provided by a surface (which will be described in more detail in due course) onto which the flexible member 20 can collapse, in the absence of gas pressure, without causing wrinkles or other stress inducing features.

It will also be noted that the diffuser is provided with an air inlet 1250 and with a plurality of mounting plate arrangements 1700 to facilitate mounting to a bottom of a pool, a frame, or to some other object or structure as desired.

Figure 7:
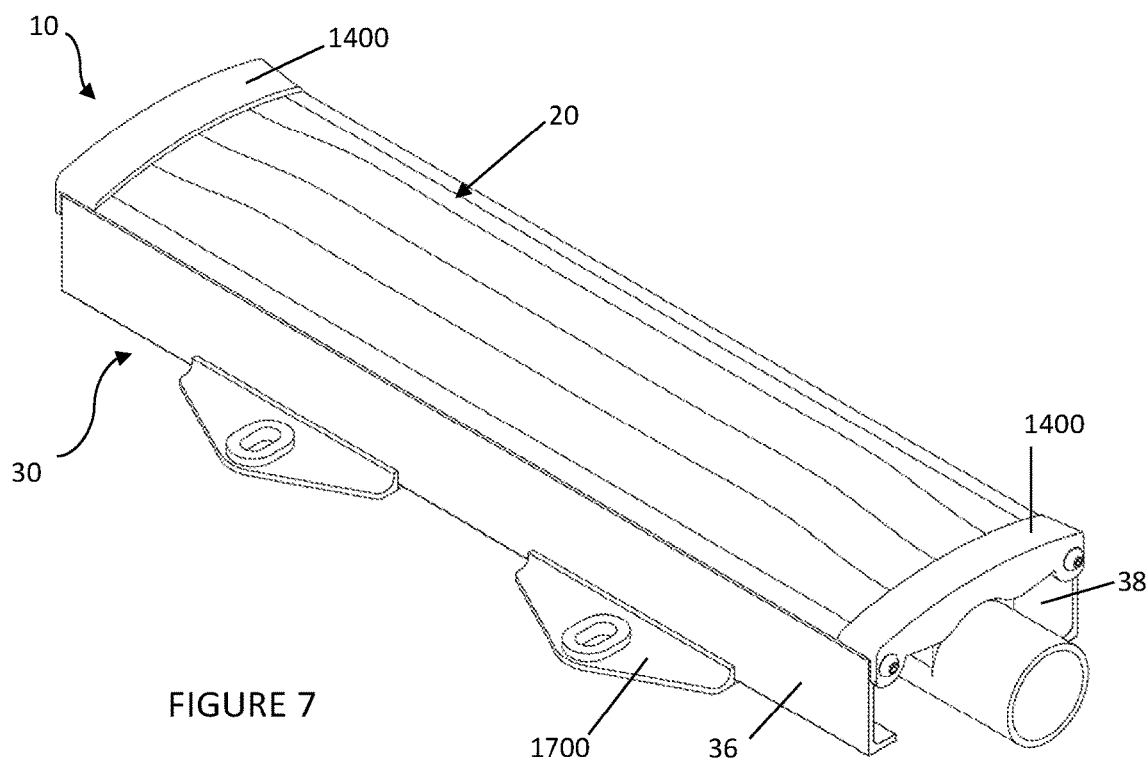
FIG. 7 is a schematic perspective view of the diffuser of FIG. 6 when sufficient air is provided to stretch the elastomeric membrane and operate the diffuser.

FIG. 7 illustrates in schematic perspective view, the diffuser 10 in a condition in which there is full working air flow. The flexible member 20 is inflated and stretched, so that the axially central region is substantially in the cross sectional configuration illustrated in FIG. 5. However, discussed above in relation to FIG. 6, the end regions of the flexible member 20 are retained in configuration substantially corresponding to the inflated but not stretched shape illustrated in FIG. 4. Thus again, there is a transition between the end regions (held in the inflated but not stretched shape) and the central region along most of the length of the diffuser 10, corresponding to the inflated and stretched configuration illustrated in FIG. 5. This transition is fairly gentle, as it is a transition between the inflated and unstretched shape and the inflated and stretched shape. It should be appreciated that a transition region of similar axial length, but providing a transition between the uninflated shape (of FIG. 3) and a fully inflated and stretched shape would likely be substantially less gentle and inflict substantially greater stress on the transition region of the flexible member 20.

Figure 8:
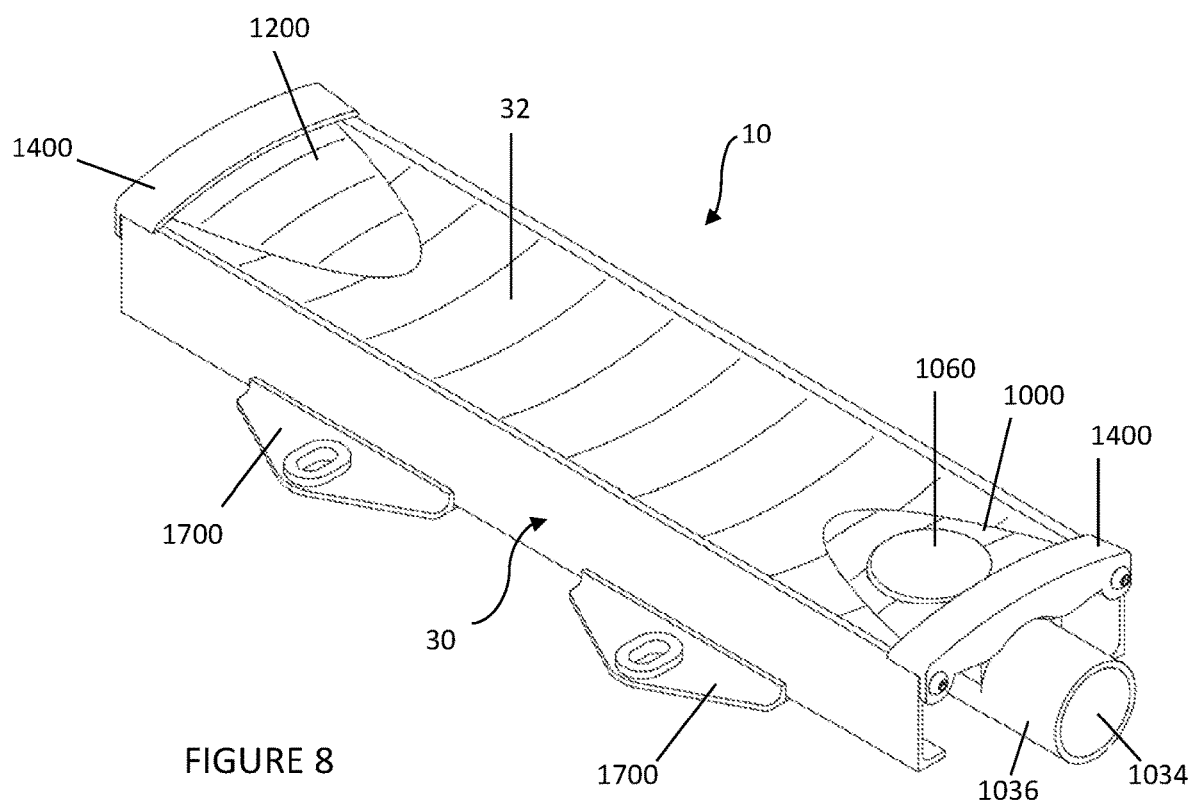
FIG. 8 is a schematic perspective view of the diffuser of FIGS. 6 and 7 with the elastomeric membrane omitted to show internal structure.

FIG. 8 illustrates in schematic perspective view, the diffuser 10, as shown in FIGS. 6 and 7, but with the flexible member 20 omitted so that interior detail of the diffuser 10 can be seen. The internal features shown in FIG. 8 can also be seen in FIGS. 9(*b*) and 9(*c*) which show the flexible member 20 partially cut away rather than omitted. Further, FIG. 9(*a*) illustrates that an air inlet is provided at one end 61 of the diffuser 10, while the other end 62 is blanked off.

For most of the length of the diffuser 10, the surface which in use faces the interior surface 29A of the flexible member 20 comprises the main surface 32, which has a recessed cross sectional shape as shown, for example, in FIG. 1.

However, at the axial ends 61, 62 of the diffuser 10, the diffuser base surface 34 is inclined to provide a gentle transition between the recessed surface shape and an end surface shape which corresponds generally to the somewhat bulging shape of the inflated but not stretched flexible member 20, as illustrated in FIG. 4. As foreshadowed above, this allows a gentle transition between the axially central and end shapes of the flexible member 20, assisting in reducing stress on, and premature damage to, the flexible member 20.

Figure 10A:
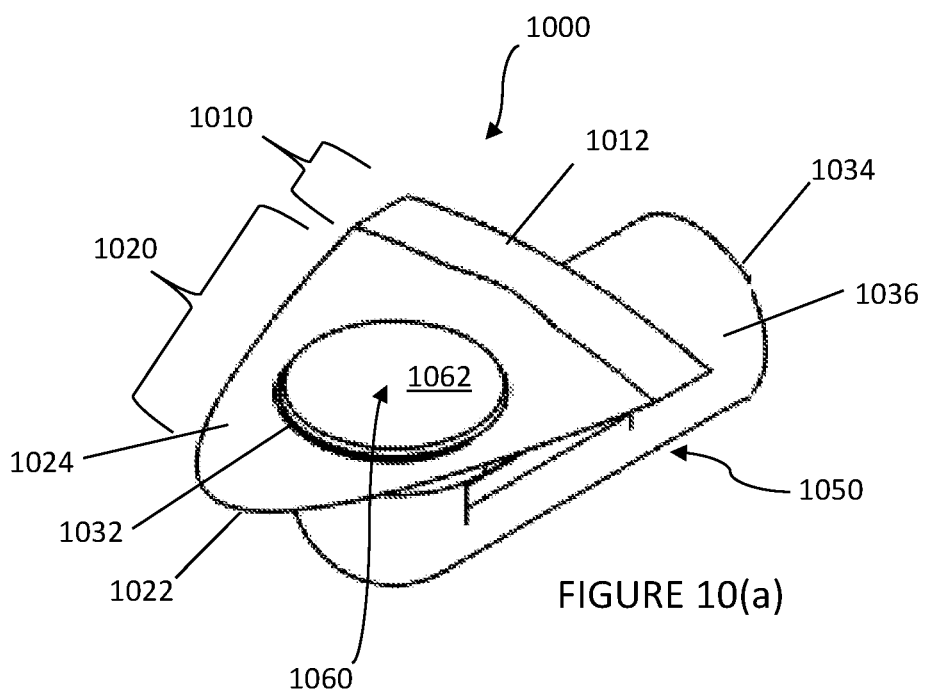
FIG. 10(a) is schematic perspective view of a tapered end inlet component as shown in FIGS. 8, 9(b) and 9c.
Figure 10B:
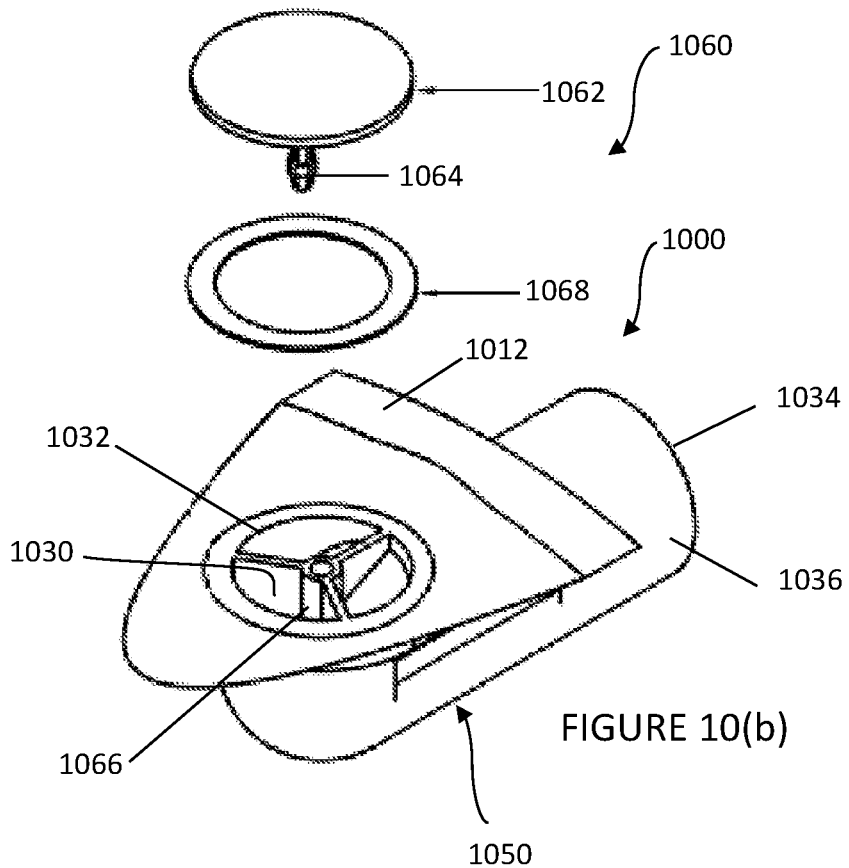
FIG. 10(b) is an exploded view of the tapered end inlet component of FIG. 10(a)
Figure 10C:
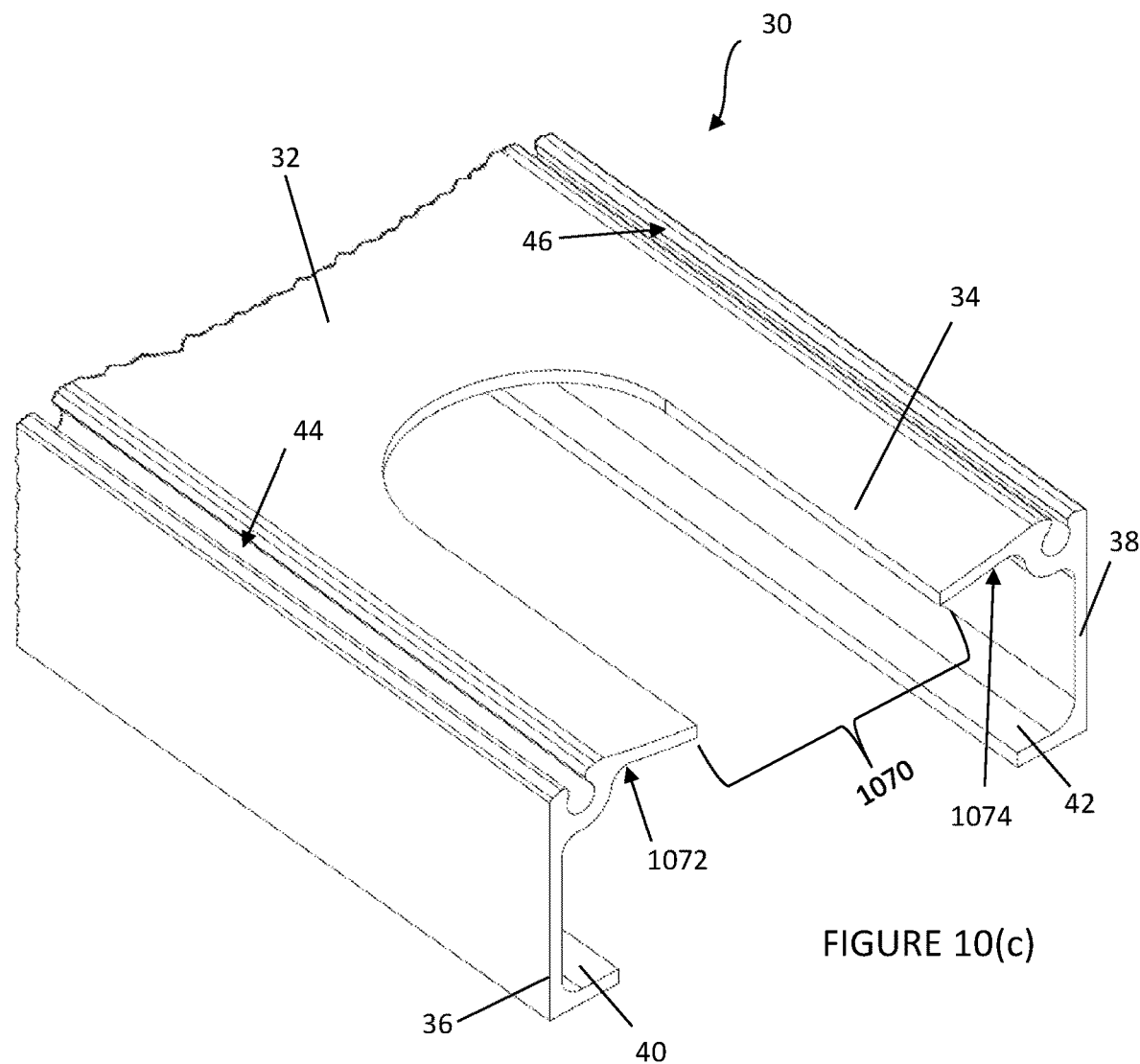
FIG. 10(c) is a perspective view of an end region of a diffuser base body with a cut-out for accommodating a tapered end inlet component as shown in FIGS. 10(a) and 10(b)

The first end and second end transitions in the illustrated embodiment are provided by shaped end pieces 1000, 1200, which are also illustrated separately in FIGS. 10 and 12, respectively.

Each of the shaped end pieces 1000, 1200 comprises a blocking portion 1010, 1210 and a tapered region 1020, 1220.

The blocking region 1010, 1210 is shaped and dimensioned to substantially fill an axially short length of the recess provided by the recessed main surface 32, and further to provide a first support surface part 1012, 1212 extending beyond the recess, to support an end region of the flexible member 20 in its inflated but not stretched shape. Thus, the blocking region may have a transverse cross sectional shape which is substantially the same as the cross sectional shape of the shape of the internal compartment 50 as illustrated in FIG. 4 (as can be seen in FIG. 12).

The tapered region 1020, 1220 is contiguous with the blocking region 1010, 1210 and provides a base engaging surface 1022, 1222 which is shaped to conform closely to the recessed main surface 32 of the diffuser base body 30, and a second support surface part 1024, 1224 which in use extends from the first support surface part 1012, 1212 to the recessed main surface 32 of the diffuser base body 30. The tapered region 1020, 1220 thus reduces in both height and lateral width as it extends away from the blocking region 1010, 1210.

The shaped end pieces 1000, 1200 may be attached to the diffuser base body 30 in any desired manner. By way of non-limiting example, this could be achieved by use of a suitable glue or adhesive, sealant, double sided tape, solvent welding material or fasteners (screws or clips). It would also be possible to hold them in place using certain types of clamping member used to retain a flexible member (membrane) in sealed connection with the rest of the diffuser at the diffuser ends. If necessary, appropriate seals, such as O-rings or other seals, could be used to provide sealed integrity of the diffuser, including the interior compartment 50, as required. As foreshadowed elsewhere, the tapered shape provided by the shaped end pieces 1000, 1200 could, if desired, be provided by appropriately shaped end regions of the diffuser base body 30.

The shaped end piece 1000 used at the first end 61 of the diffuser 10 provides an air inlet arrangement 1050, integrally formed therewith. The air inlet arrangement 1050 comprises a passage 1030 which extends through the shaped end piece 1000 and which has a gas outlet 1032 provided as an opening in the second support surface part 1024 and a gas inlet 1034 provided by a pipe connection 1036 in fluid communication with the passage 1030 and projects externally of the diffuser 10. The pipe connection 1036 is adapted for connection to an air supply pipe or hose, and may comprise any suitable type of connection, for example, a male, or spigot-type, connection, or a female, or socket-type, connection. Further, any desired type of connection-securing arrangement, such as a screw threaded or other type of hose or pipe coupling may be used.

The air inlet 1050 may be provided with a check valve 1060 (sometimes called a non-return valve) as a precaution against any liquid which might have undesirably entered the interior compartment 50 flowing into the gas supply pipe (not shown) that feeds gas to the diffuser. Many types of check valve are known per se, and any suitable check valve arrangement could be used (for example, a ball check valve, a diaphragm check valve, a swing check valve or the like). In the illustrated embodiment, the check valve 1060 is a lift check valve provided at the opening 1032 and comprises a disc or lift 1062, which can be lifted off a seat formed by the opening 1032, and which is retained in the opening by a stem 1064 attached to the a disc or lift 1062 being retained in a guide 1066 which is mounted in the opening. A seal 1068 may be provided between the disc 1032 and the opening 1032 to enhance sealing when the check valve 1060 is closed. The manner in which a lift check valve works will be understood by the skilled addressee, and will not be described in further detail.

In this embodiment, in order to accommodate the pipe part of the air inlet, and allow the shaped end piece 1000 which includes the pipe part to be fitted on to the diffuser body 30, in-use upper wall 34 of the diffuser body 30 is provided with a cut-out 1070 at the (or each) end of the diffuser 10 at which a shaped end piece with a pipe is to be fitted. FIG. 10(*c*) shows an end region of the diffuser body 30 in which a cut-out 1070 is provided. The cut-out 1070 is formed by removing some of the in-use upper wall 34 between two remaining side regions 1072, 1074 of the diffuser body 30. In this embodiment, the side regions 1072, 1074 each comprise part of the structure that forms the attachment regions 44, 46 and an adjoining side-part of the in-use upper wall 34. That is, some of the laterally central region of the in-use upper wall 34 is missing, to provide the cut-out.

The shaped end piece 1000 may also incorporate a fail closed valve which, in the event of a membrane failure, will shut off air flow to the failed diffuser thereby maintaining air pressure in the rest of the feed system to be maintained, and allowing the remaining diffusers in the aeration system to operate normally. It has been known for failure of a diffuser membrane (e.g. flexible member 20) to result in the very large amount of air escaping through the inoperative diffuser compromising the aeration process performed by other, connected, diffusers to an extent where the grid with the failed diffuser must be isolated from the aeration process.

A fail closed valve suitable for such use may comprise a valve which is effectively a gas fuse valve, which is a type of valve known per se, used to prevent flow of gas therethrough in response to an undesirably great flow of gas. A fail closed valve suitable for use such use may comprise a valve member which remains in an open (effectively inoperative) position when the air flow is below a threshold level, the threshold level being above normal operating air flow levels, and which moves into a closed (or air shut-off) position in response to the air flow exceeding the threshold level, and then remains in the closed position, despite the air flow level dropping due to operation of the valve. In an embodiment the valve may comprise a member having a tapered surface, which is arranged to be moved into engagement with a complementary tapered surface in response to air flow above the threshold level, with the engaged position corresponding to a closed position of the valve member. The taper may be a 'self-holding' class of taper, such as for example a Morse taper, so that after activation (closure) the valve remains in the closed condition despite the air flow level dropping (to zero and/or to below the threshold level) due to operation of the valve. In one alternative the valve may comprise a gate-like valve member which is normally open and is arranged to be moved into a closed position in response to air flow above the threshold level and a latch arrangement to retain the gate-like valve member in the closed position after activation despite the air flow level dropping (to zero and/or to below the threshold level) due to operation of the valve. While the fail closed valve may be incorporated into the shaped end piece 1000, such a valve may be provided elsewhere in the air supply system of a diffuser.

The shaped end piece 1200 is for blanking off the second end 62 of the diffuser 10, and therefore does not include an air inlet or internal passageway. However, if it is desired to connect two or more diffusers 10 in series, so that one diffuser supplies gas to the next in series, then a diffuser which supplies gas can have a shaped end piece at its second end which provides a gas outlet (not shown). In this case, the shaped end piece at the second end of the diffuser, which provides the outlet, could be similar or identical to the illustrated shaped end piece 1000, but without the check valve (and, of course, acting as a gas outlet rather than a gas inlet).

Figure 11A:
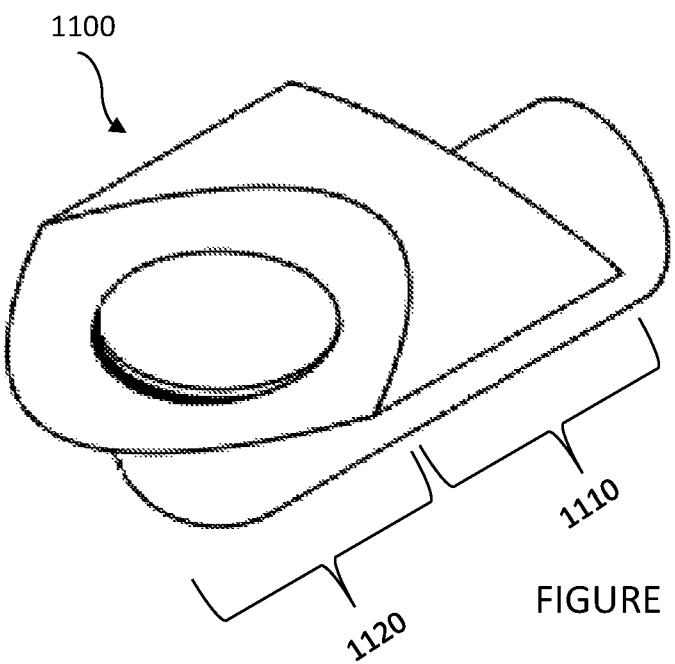
FIG. 11(a) is schematic perspective view of an alternative embodiment of a tapered end inlet component slightly different in shape to the tapered end inlet component FIG. 10(a)
Figure 11B:
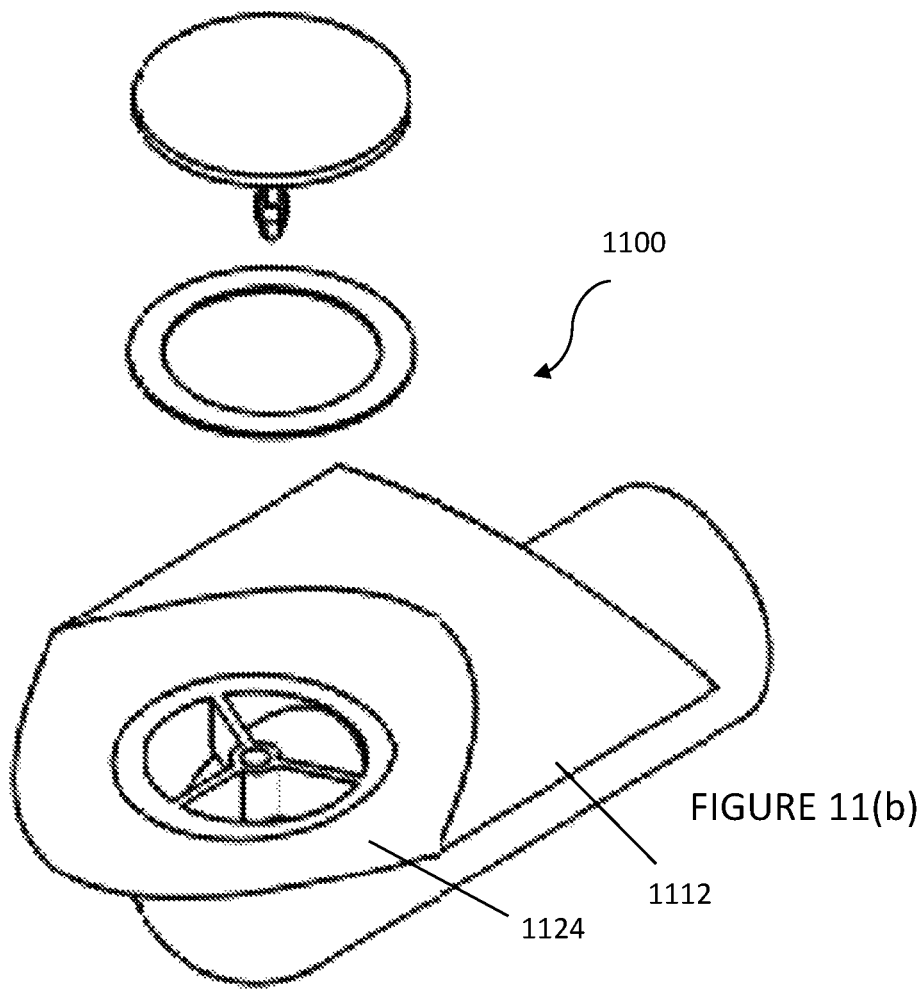
FIG. 11(b) is an exploded view of the tapered end inlet component of FIG. 11(a)

FIGS. 11(*a*) and 11(*b*) show a shaped end piece 1100 which is similar to the shaped end piece 1000, but a variation thereof which is shaped slightly differently. That is, a blocking region 1110 of end piece 1100 extends further in the axial direction than does the blocking region 1010 of end piece 1000, and correspondingly a first support surface part 1112 extends further in the axial (length) direction of the diffuser than does first support surface part 1012 (but is, like first support surface part 1012, provided to support an end region of the flexible member 20 in its inflated but not stretched shape. Further, tapered region 1120, is axially shorter than the tapered region 1020 of shaped end piece 1000, and the boundary between the first and second support surface parts 1124, 1112 is curved, rather than being substantially straight like the boundary between the first and second support surface parts 1024, 1012, so that the first and second support surface parts 1124, 1112 overlap in the axial direction.

Figure 14A:
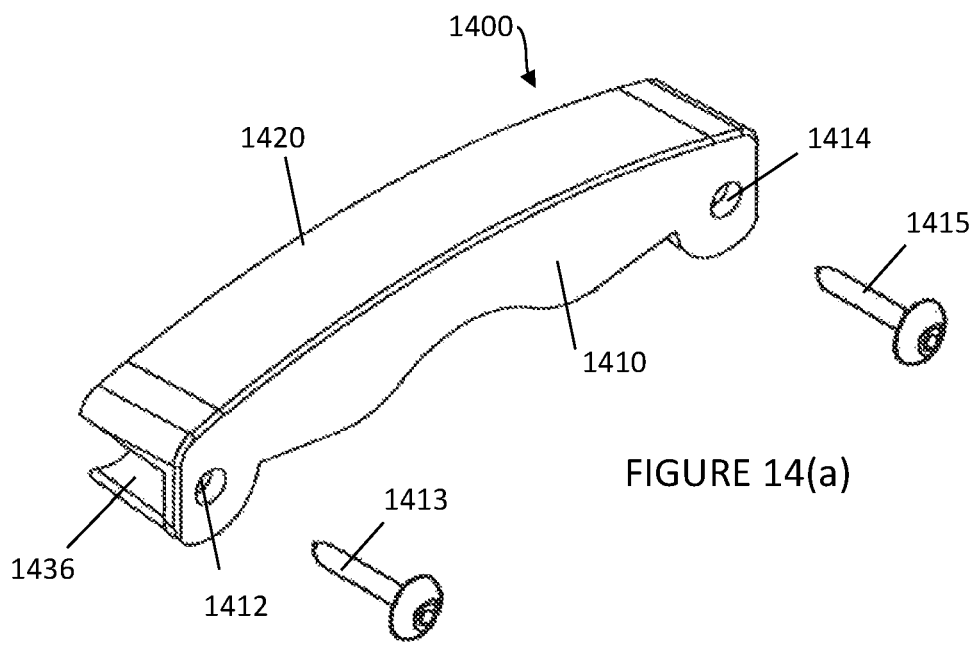
FIGS. 14(a) and 14(b) are schematic perspective views of an end retainer component.
Figure 14B:
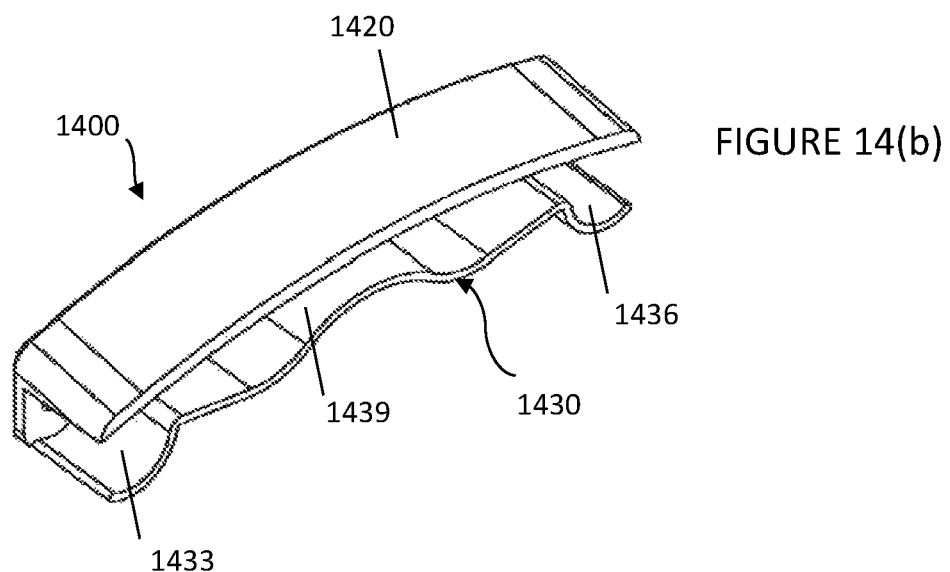

FIGS. 14(*a*) and 14(*b*) illustrate an embodiment of a retaining clamp 1400, which is an embodiment of an end sealing part.

The retaining clamp 1400, in this embodiment, comprises an end clamping portion 1410 which is adapted to press or clamp an end region of the flexible member 20 against an end of the diffuser. Thus, a seal can be provided between the flexible member 20 and an end of the diffuser body and/or tapered end piece.

The retaining clamp 1400, in this embodiment, comprises an axially extending upper clamping portion 1420 (which extends somewhat and, in this embodiment, a short distance, in the axial direction of the diffuser). The axially extending upper clamping portion 1420 in use overlies a region of the flexible member 20 close to the end thereof and is adapted to press or clamp this part of the flexible member 20 against a surface of the diffuser body 30 and/or shaped end piece 1000, 1200 which extends in an axial or length direction of the diffuser. In this embodiment, the axially extending upper clamping portion 1420 in use presses the corresponding part of the flexible member 20 against the first support surface part 1012, 1212 of a shaped end piece 1000, 1200.

In this embodiment, the retaining clamp 1400, further comprises an axially extending lower clamping portion 1430 (which extends somewhat and, in this embodiment, a short distance, in the axial direction of the diffuser). The axially extending lower clamping portion 1430 in use underlies a region of the flexible member 20 at to the end thereof and is adapted to press or clamp this part of the flexible member 20 upwardly against a surface of the diffuser body 30 and/or shaped end piece 1000, 1200 which extends in an axial or length direction of the diffuser. In this embodiment, the axially extending lower clamping portion 1430 is contoured to follow the curves of a bottom surface of the end part of the diffuser base, which in this embodiment, at the inlet end of the diffuser, is provided by the end regions of the side regions 1072, 1074 of the diffuser body 30 on either side of the cut-out 1070, and a bottom surface of an end part of the shaped end piece 1000 which extends between the side regions 1072, 1074. The axially extending lower clamping portion 1430 thus comprises first and second lateral side parts 1433, 1436 contoured to fit the lower surfaces of the side regions 1072, 1074 and a more laterally central part 1439, contoured to fit the lower surface of the shaped end piece 1000.

The retaining clamp 1400, further comprises an attachment arrangement for attaching it relative to the rest of the diffuser 10. The fixing arrangement may comprises one or more apertures, each for receipt of fastening member therethrough. In this embodiment, two such apertures 1412, 1414 are provided, each for receipt of a fastener, e.g. a threaded fastener such as a screw 1413, 1415 therethrough.

It will be appreciated that an end sealing part which comprises only one of an end clamping portion or an axially extending clamping portion may (in certain embodiments) be sufficient to provide a suitable end seal. In the illustrated embodiment, the retaining clamp 1400 comprises both the end clamping portion 1410 and the upper and lower axially extending clamping portions 1420, 1430, which is considered to assist in providing a robust seal and to assist assembly of the diffuser, including retention of the end portion of the membrane during application of the fasteners and positioning of the retaining clamp 1400. The axially extending clamping portion 1420, especially where the surface which bears against the external face 29B of the flexible member corresponds substantially to the shape of the flexible member when the flexible member 20 is inflated by not stretched, can also assist in avoiding application of undue stresses to the flexible member.

FIG. 15(*a*) illustrates a length 1500 of flexible member 20 which has been manufactured or tailored (for example, from a cross sectionally uniform extrusion) for securing to a diffuser base body 30 of a particular length, using shaped end pieces 1000, 1200 and retaining clamps 1400.

The length 1500 of flexible member 20 provides an end region 1510 in a form suitable for being passed around or over an end of the diffuser base body 30 and an axially outer end of a shaped end piece 1000, 1200. In this embodiment, the end region 1510 is free from sealing strips 25, 26 which extend along most of the length 1500 of flexible member 20. If the length 1500 of flexible member 20 is prepared from a cross sectionally uniform extrusion, the end parts of the sealing strips 25, 26 may be simply cut or trimmed off. The end region 1510 is also provided with apertures 1512, 1514 for passage of fastening members (e.g. screws 1413, 1415) therethrough. The apertures 1512, 1514 may be formed in appropriate positions prior to attachment of the length 1500 of flexible member 20 to the diffuser base body 30, or if appropriate taking into consideration the characteristics of the flexible member 20 may be made after attachment to the diffuser base body 30 and positioning of a retaining clamp 1400, for example, by insert of screws or a separate step such as use of a heated awl or the like. A further, opposed end region 1520 may correspond to the end region 1510.

FIG. 15(*b*) illustrates schematically the shape of a lateral half of the length 1500 of flexible member 20 when it is secured to a diffuser base body 30 using shaped end pieces 1000, 1200 and retaining clamps 1400, but does not show those other components of the diffuser 10.

Figure 16:
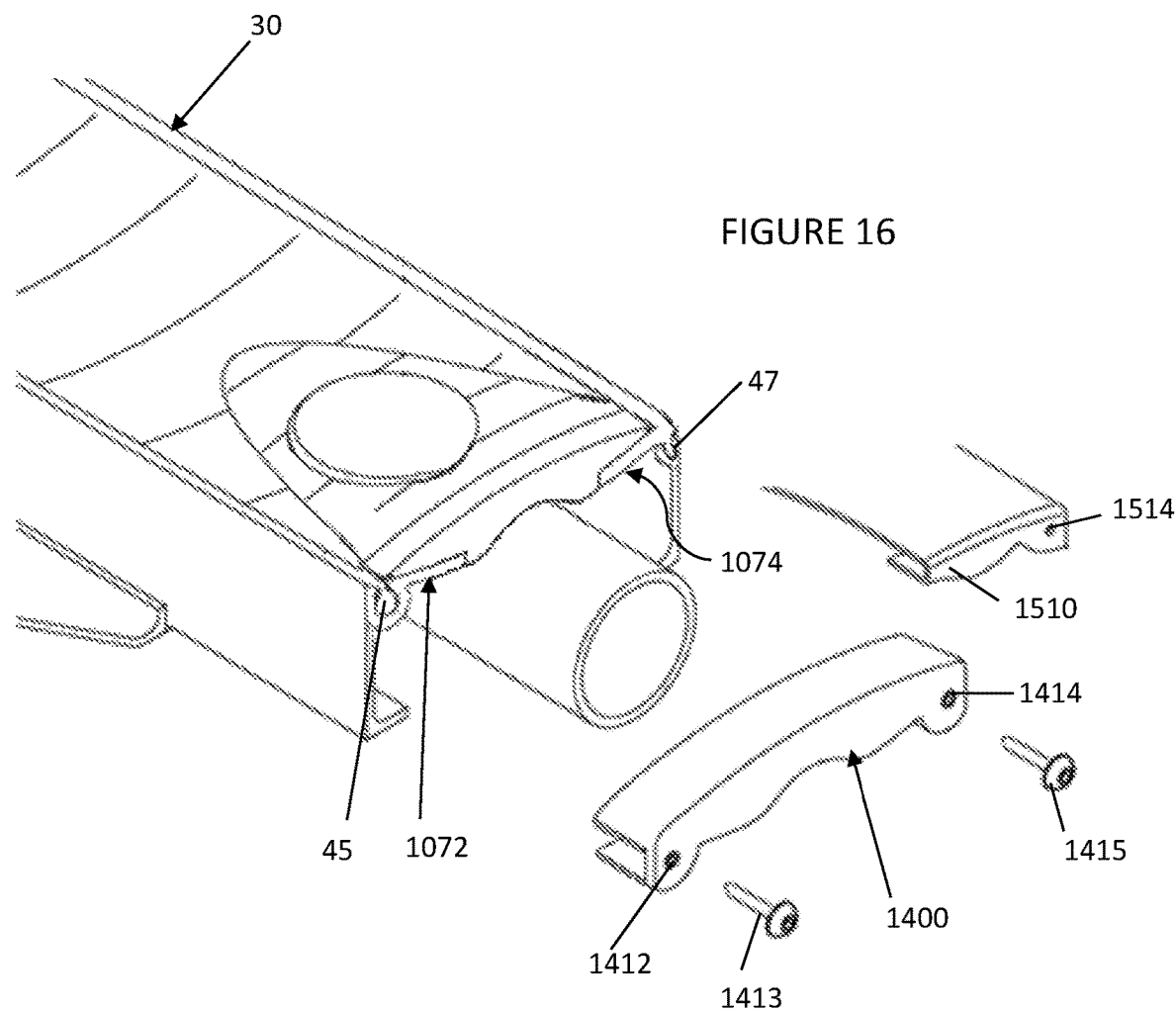
FIG. 16 is a schematic perspective view illustrating assembly of a diffuser by attachment of an elastomeric membrane onto a base part of a diffuser.

With reference to FIG. 16, the sealed attachment of the length 1500 of flexible member 20 to the diffuser base body 30 can be performed as follows. It will be appreciated that FIG. 16 shows only one end, but that the arrangement at the other end may correspond, and will be apparent to the skilled addressee from the following description. In this embodiment, the sealed attachment may be performed by inserting (and securing) the sealing strips (25, 26, but not shown in FIG. 16) of the flexible member 20 in the corresponding grooves 45, 47 of the diffuser base body 30, and then wrapping end regions 1510 (which is short in axial length and which does not have sealing strips 25, 26) around the end of the diffuser body, including around the terminal (blocking region) end of the shaped end piece 1000, and then retaining the end region 1510 of the flexible member 20 in sealed connection with the other components by applying and securing retaining clamp 1400 over the axial end of the diffuser base body 30 and shaped end piece 1000. The wrapping of the end regions 1510 around the end of the diffuser body will include some stretching of the end regions 1510. The assembly is secured by screws 1414, 1415 which are passed through the apertures 1412, 1414 in the retaining clamp 1400, through the apertures 1512, 1514 in the membrane, and into the grooves 45, 47 of the diffuser base body 30. Clamping forces applied by the retaining clamp 1400 may be increased, or adjusted, as needed by adjustment (tightening or loosening) of the screws, to provide a desired seal.

The diffuser 10 may include mounting plates 1700 for mounting the diffuser to a floor of a tank, or to a frame (not shown).

Figure 17:
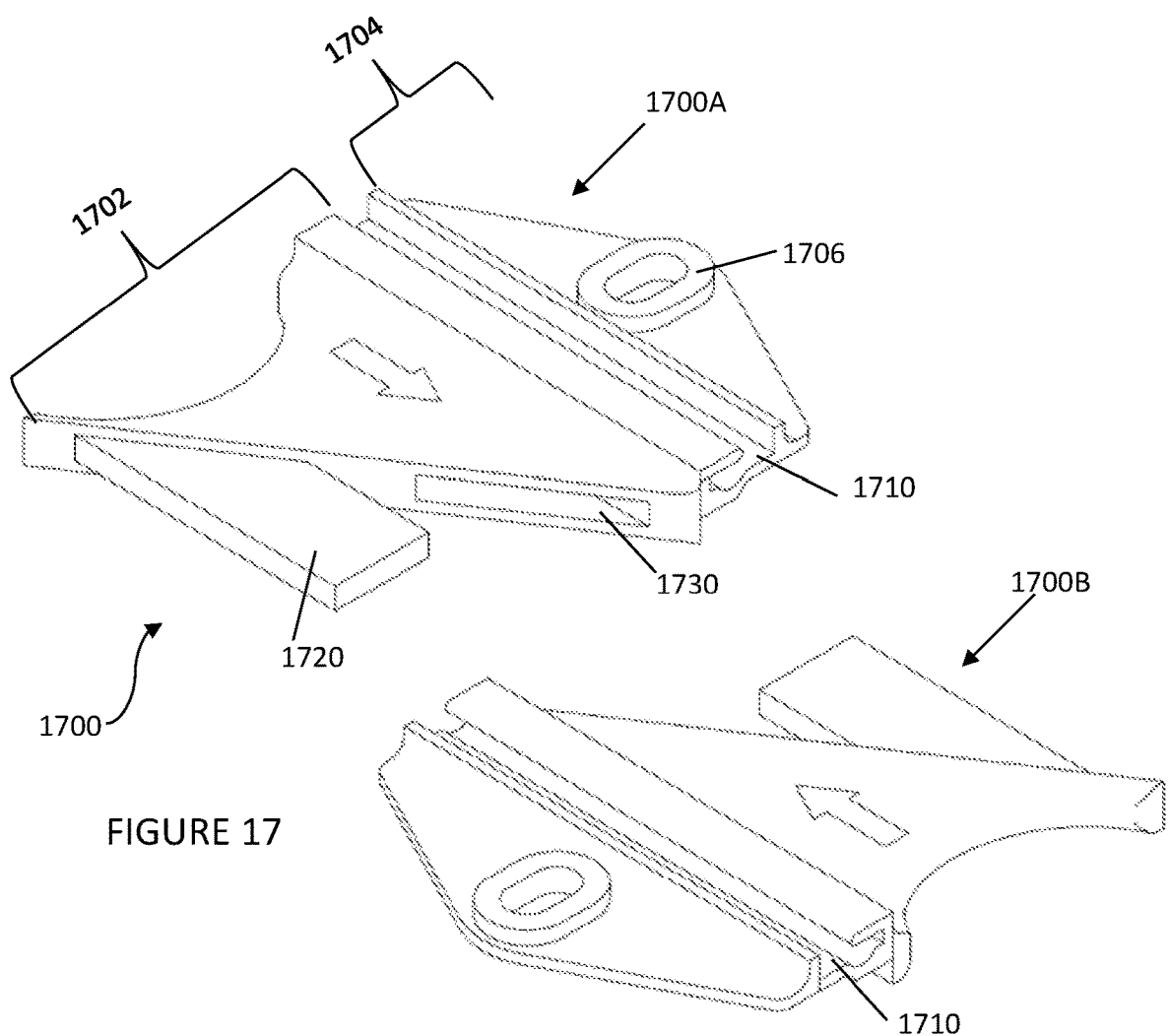
FIG. 17 is a schematic perspective view of two baseplate parts of a fixing arrangement for fixing the diffuser to a floor.
Figure 18:
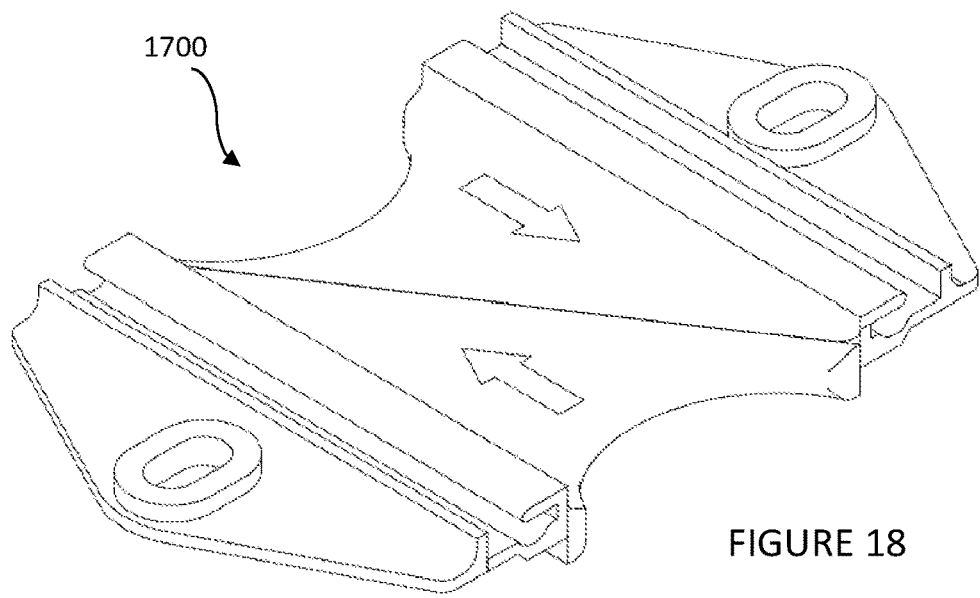
FIG. 18 is a schematic perspective view of the two baseplate parts of FIG. 17 connected together.
Figure 19:
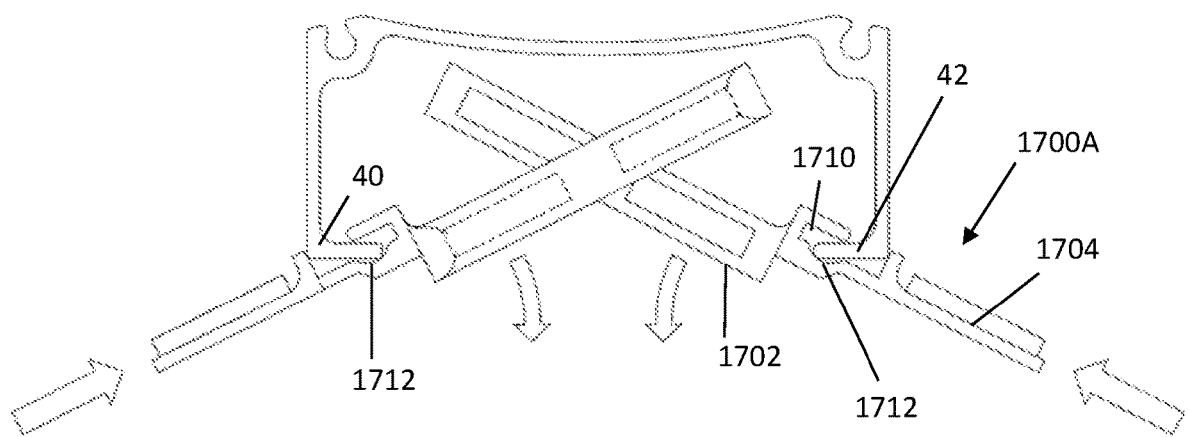
FIG. 19 is a schematic end view illustrating connection of each of the two baseplate parts of FIGS. 17 and 18, separately, to a diffuser body.

FIGS. 17 to 19 illustrate an embodiment of a two part mounting plate 1700 for mounting the diffuser to a floor of a tank, or to a frame.

In this embodiment, the two part mounting plate 1700 comprises two substantially identical mounting plate parts 1700A, 1700B.

With reference to one mounting plate part 1700A, each of the parts 1700A, 1700B comprises a groove 1710 for accommodating at least some of a side region of the diffuser 10, such that the mounting plate part can slide along the engaged side region in the axial direction of the diffuser 10.

In the illustrated embodiment, the groove is for accommodating part of one of the inwardly directed flange walls 40, 42.

Each mounting plate part 1700A, 1700B has a laterally inwardly directed part 1702 which in use projects from the groove 1710, part of the distance towards the side of the diffuser 10 which is not engaged by the groove 1710, so that in use it extends substantially laterally inwardly from the engaged side of the diffuser, but across a distance less than the entire width of the diffuser 10.

Each mounting plate part 1700A, 1700B further comprises a laterally outwardly directed part 1704 which in use projects from the groove 1710, laterally outwardly relative to the diffuser. The laterally outwardly directed part 1704, provides a fixing formation 1706, in this embodiment, in the form of a reinforced aperture, for facilitation fixing of the mounting plate 1700 to a mounting structure such as the floor of a tank or a frame for mounting diffusers thereon.

The mounting plate part 1700A further comprises an engaging formation for engaging the other mounting plate part 1700B. The engaging formation, in this embodiment, comprises a projection 1720 for engagement within a complimentary recess of the other mounting plate part 1700B, and a recess 1730 for receiving a complimentary projection of the other mounting plate part 1700B.

In this embodiment, the groove 1710, the projection 1720 and the recess 1730 extend in substantially parallel directions.

In use, the mounting plate part 1700A, with a first-side inwardly directed flange wall 40 engaged within its groove 1710, can slide along first-side inwardly directed flange wall 40 in the axial direction of the diffuser, and the other mounting plate part 1700B, with a second-side inwardly directed flange wall 42 engaged within its groove 1710, can slide along the second-side inwardly directed flange wall 42, also in the axial direction of the diffuser.

Thus, in use, the two the mounting plate parts 1700A, 1700B can be slid towards (and away from) each other.

Because the laterally inwardly directed part 1702 does not extend the entire width of the diffuser, it can be placed substantially in the channel 48 of the diffuser 10 at substantially any desired axial position along the length of the diffuser 10. Thus, each mounting plate part 1700A, 1700B can be positioned in engagement with the diffuser at substantially any desired axial position along the length of the diffuser 10.

In use, the mounting plate parts 1700A, 1700B are positioned in engagement with opposite sides of the diffuser 10 at axial positions of the diffuser 10 close to a position where it is desired to locate a mounting plate, with the projection 1720 of each mounting plate part 1700A, 1700B extending towards the other mounting plate part.

When the mounting plate parts 1700A, 1700B are slid into engagement, the projection 1720 of each mounting plate part is received in the complimentary recess 1730 of the other mounting plate part, with a fit sufficiently tight to prevent relative lateral movement of the two mounting plate parts 1700A, 1700B.

The two mounting plate parts 1700A, 1700B thus effectively provide a single mounting plate which can be used to mount the diffuser by use of the fixing formation 1706.

The two part mounting plate 1700 provides a mounting plate which can be readily attached to the diffuser base body 30 at the required axial location rather than having to be inserted at an end and slid along from the end to the desired position. This becomes increasingly beneficial as the axial length of the diffuser increases.

FIG. 19 illustrates how the mounting plate parts 1700A, 1700B in a particular embodiment can be engaged with the (e.g. diffuser body 30). Each groove includes a widened region 1712 for allowing the mounting plate parts 1700A to be fully engaged with an inwardly directed flange wall 40, 42 by partial insertion into the groove 1710 and then rotation of the mounting plate parts 1700A, 1700B to provide full insertion of the flange wall 40, 42 into the groove 1710.

It should also be noted that the laterally outwardly directed part 1704 is, when the mounting plate 1700 is assembled and horizontal, vertically offset from, and higher than the laterally inwardly directed part 1702. Thus, when fasteners such as screws or bolts (not shown) are used in the apertures 1705 to force the outwardly directed parts 1704 downwardly, substantial opposed torques (or rotational forces) will be applied to the connections between the grooves 1710 and the flange walls 40, 42 and between the projections 1720 and the recesses 1730. These forces effectively lock the mounting plate parts 1700A, 1700B together, and prevent sliding relative to the diffuser body, once the fasters are tightened.

It will be appreciated that a variation could provide two projections on one of the component parts of a two part mounting plate, and two complementary receiving recesses on the other of the component parts. Further variation could provide different numbers of projections and complementary receiving recesses, including the possibility of a single projection on one of the component parts of a two part mounting plate, and a single complementary receiving recess on the other of the component parts.

An arrangement in which both parts, e.g. 1700A, 1700B, of the two part mounting plate are identical can assist in reducing manufacturing cost, for example, by requiring only a single mould, rather than two different moulds, for manufacture by injection moulding. Further, the parts, e.g. 1700A, 1700B, are each smaller than a similar single-piece mounting plate would be, allowing use of a smaller injection mould and moulding, and hence providing a reduction in cost. Further, having both parts, e.g. 1700A, 17008, of the two part mounting plate identical means that any two parts can be used together to provide the assembled mounting plate, avoiding the possibility of wasted time resulting from a worker inadvertently selecting two parts that cannot be assembled together, or in ensuring that parts are provided in usable sets or pairs.

Figure 20:
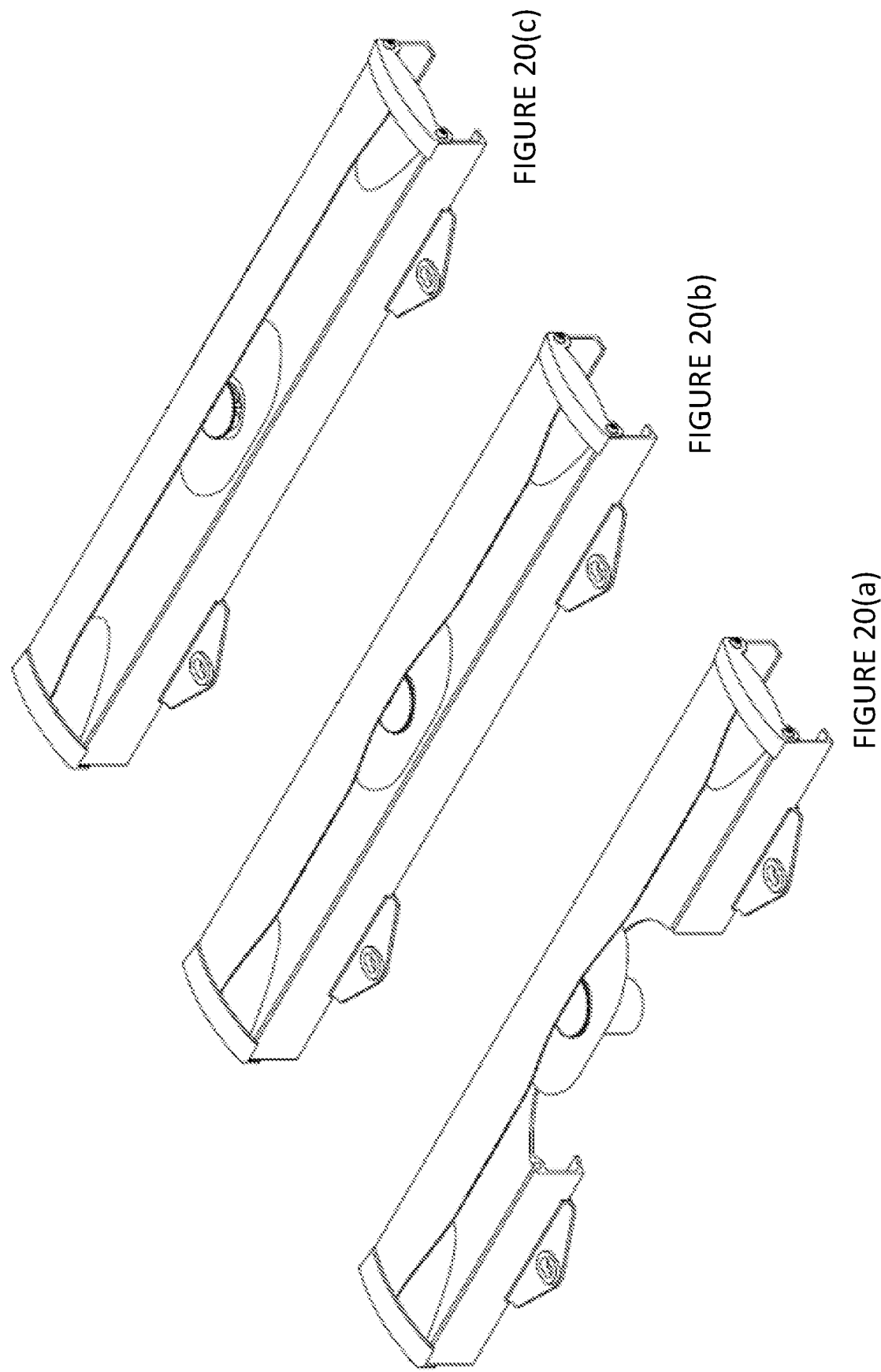
FIGS. 20(a), 20(b) and 20(c) illustrates an alternative embodiment of a diffuser, in which the air inlet is provided in an axially central region, utilising the air inlet component of FIGS. 13(a) and 13(b)

FIGS. 20(a) to 20(c) illustrate a variation 2000 in which gas is fed into a diffuser at an axially central region thereof, rather than from an end. In this embodiment, the diffuser 2000 is provided with a gas inlet which is centrally located. In such an embodiment, both ends may have shaped end pieces for blanking off the ends, so that the both of the shaped end pieces may be similar or identical to the shaped end piece 1200 of FIG. 12. Alternatively, the shaped end pieces may allow the passage of air for connection of further diffusers at either or both ends. The central gas inlet may include a check valve, and an example is illustrated in FIGS. 13(a) and 13(b).

As foreshadowed above, the diffuser disclosed herein is designed to form its own "pipe" by creating an elongate interior compartment along which air may be distributed along the length of the diffuser, so that no convention pipe or hose, and no conduit defined entirely or almost entirely by the diffuser base body is required.

The ability of the diffuser to distribute gas along the length of the diffuser via the internal compartment is enhanced by incorporating a recessed or concave curve, rather than the flat or typical upwards or convex curve into the part of the body of the diffuser that forms part of the boundary of the interior compartment. The recessed part can, but does not necessarily, extend across the entire surface of the body that forms part of the boundary of the interior compartment, but at least in preferred embodiments, should be sufficient to increase the cross sectional size of the interior compartment or "pipe" compared to the body providing a planar surface to bound the interior compartment (all other things being equal).

This conduit or "pipe" effect means that diffusers can be provided with significantly longer axial length than many (possibly any) previously commercially available fine bubble strip diffusers. Diffusers in accordance with the present disclosure have been demonstrated to successfully deliver air to the end of a diffuser at least 12 m long. Diffusers in accordance with the present disclosure avoid the occurrence of excessively high local velocities in the distributed gas, which can otherwise cause drag on the membrane thus cause the membrane to flutter and act in an unstable manner.

Further, use of longer diffusers allows fewer hose or pipe connections, and fewer components to be used, which can provide efficiencies in cost and efficiency of assembly and/or installation.

Of course, shorter lengths are also possible with the disclosed diffusers if desired or necessary to meet the dimensions of the reactor to be aerated. These can be of any shape including rectangular, square and circular or combinations of these, e.g. oxidation ditches.

The cross sectional shape of the diffuser base body disclosed herein is simple, making easier to form, for example by extrusion or pultrusion than diffuser bodies that are more complex in cross sectional shape (for example, because the body itself defines an interior conduit).

Further, some known diffusers using bodies formed of plastic and which include a pipe-like or hollow diffuser body, are in use sufficiently buoyant that resultant uplift forces require substantial ballast or more or larger restraints (compared to at least some embodiments described herein) to hold the diffuser in place while in service.

Another beneficial feature of at least some embodiments is that the underside of the diffuser is unrestricted other than at mounting supports (mounting plates). It does not include any additional lateral supports, webs, or internal conduit parts that would increase the likelihood of it holding o trapping biological material which could putrefy. It has been known for the profile of some commercially available diffusers to undesirable trap mixed liquor within conduit parts thereof.

Another beneficial feature of at least some embodiments is that the diffuser is that the action of inflating the flexible member 20 to a convex profile (as shown in FIG. 4), promotes the removal of any debris which may settle on the membrane during non-operating time. It will be noted that the diffuser 10, as a whole, has a profile which slopes downwardly (as shown) from the top of the inflated membrane, and is free from upwardly extending external protrusions which would be likely to trap debris and prevent the removal of debris from the membrane when the flexible member (membrane) is inflated. (The action of air bubbles being emitted from the diffuser aids the transport of debris material from the upper surface of the membrane and diffuser, but in some known diffusers this has proven insufficient to avoid debris being trapped.)

Figure 21:
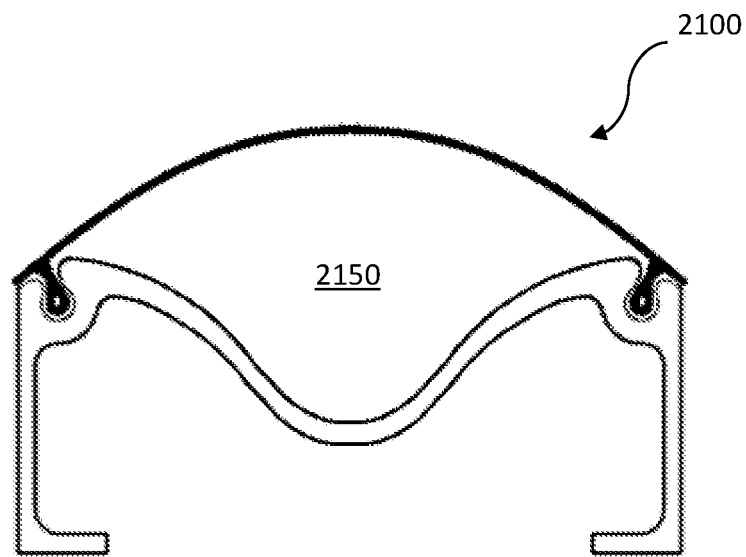
FIG. 21 is a schematic cross sectional view of an alternative embodiment of a base part of a diffuser and associated membrane, in an in-use configuration.
Figure 22:
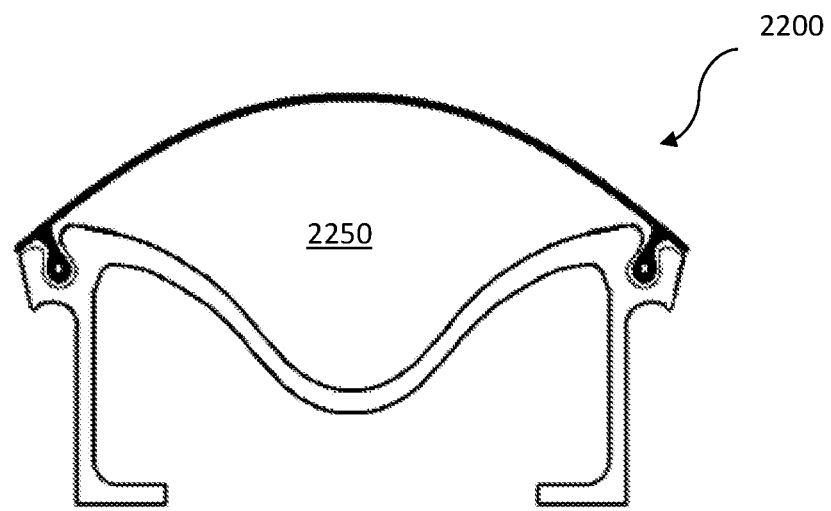
FIG. 22 is a schematic cross sectional view of a further alternative embodiment of a base part of a diffuser and associated membrane, in an in-use configuration.

FIGS. 21 and 22 illustrate alternative embodiments 2100, 2200, in which the recessed surface which bounds the interior compartment is much more recessed, and has a much greater curvature than that illustrated in FIGS. 1 to 16 and 20. This can provide an interior compartment 2150, 2250 (and thus a resulting pipe or conduit, effectively formed by the interior compartment) which has a greater cross sectional size for a given width of the diffuser. For example, a radius of curvature, in the transverse direction may be of the order of half the width of the diffuser. While embodiments of this type may be useful under some circumstances, it is often undesirable to have a diffuser which is too narrow, as this may adversely affect bubble distribution, and a suitably wide diffuser with an internal compartment with cross sectional shape as shown in FIG. 21 or 22 may be more buoyant than is desirable. Selecting an appropriate cross sectional shape may therefore include balancing capacity to distribute gas along the length of the diffuser, diffuser width, buoyancy and other factors.

The cross sectional shape of the embodiment of FIGS. 1 to 5 is considered suitable for a wide range of typical wastewater aeration applications, providing sufficient cross sectional area in the interior compartment for the distribution of air for diffusers up to 12 m long, the greatest length likely to be readily handled and transported, while avoiding unnecessary buoyancy and associated uplift.

Of course, the above features or functionalities described in relation to the embodiments are provided by way of example only. Modifications and improvements may be incorporated without departing from the scope of the invention.

Some examples of envisaged variations and alternative embodiments and variations which may be incorporated without departing from the scope of the present disclosure are described hereafter.

Different attachment/sealing of the membrane to the diffuser base at the ends may be used. A number of different type of devices and arrangements for sealing the membrane and base at the ends of strip diffusers are known per se, and in variations or alternative embodiments any suitable known type could be used. For example, any one or more of screwed clamps, spring clips, sealant, glue etc. could be used without departing from the scope of the present disclosure.

Different attachment/sealing of the membrane to the base at the lateral sides. Engagement of a bulb (whether integrally formed with the membrane or provided as a separate, spline-like, sealing strip) has been described in detail, but it should be appreciated that there are other known arrangements for sealing the membrane and base along the lateral edges of strip diffusers, and in variations or alternative embodiments any suitable known type could be used. For example, in one alternative form of edge seal, known per se in the field of diffusers, the membrane may be clamped to the base along or adjacent the lateral sides thereof. In such an arrangement lateral side regions of the membrane may be folded over, or otherwise conformed in shape to, lateral side regions of the base either prior to or at least partly as a result of the action of, application of one or more clamp members.

An issue that sometimes arises in use of diffusers for aerating wastewater is that when warm humid air enters the piping system which feeds the diffusers, water may condense on the walls of the pipes (including the downcomer) which convey pressurised air from blowers or compressors to the diffusers. The condensate may pool in low lying areas of the pipes and may build up over time, causing problems, especially if the height of the accumulated water reaches the height of the diffuser membranes. These problems can include adverse effects on air distribution through the piping system, including reduced air flow at the diffusers, and fouling of the back (interior) sides of the diffuser membranes. This issue can be exacerbated in intermittent aeration applications. Water could be purged manually using a suitable manual purge valve system. This would rely on plant operators performing such purging on a regular basis.

With reference to FIGS. 23 to 31, a valve arrangement which can allow automatic purging of water from a piping system which feeds air diffusers will be described. It will be appreciated that the disclosed valve arrangement may have other uses, particularly in situations where water is to be purged from submerged air (or other gas) supply pipes.

With reference to FIGS. 23 to 31, a valve arrangement generally designated by the reference numeral 2300, comprises a float valve arrangement and a duckbill valve arrangement, which act together to allow purging of water from a feed pipe of an air diffuser while resisting entry of water, in which the diffuser and feed pipe are submerged, into the feed pipe.

Figure 23:
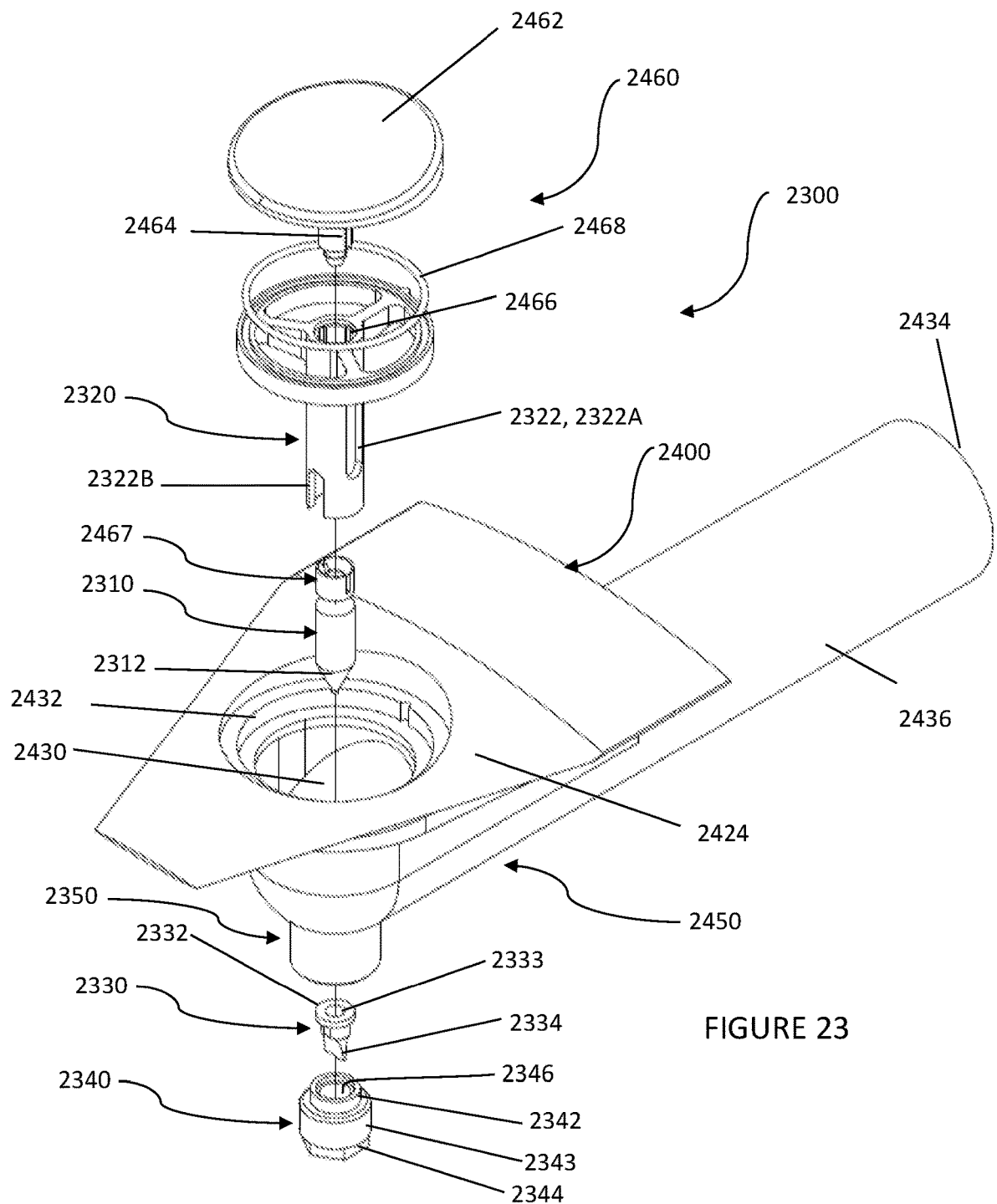
FIG. 23 is schematic perspective exploded view of an alternative embodiment of a tapered end inlet component, with similarities to the tapered end inlet components of FIGS. 10(a), 10(b), 11(a) and 11(b), which includes a purge valve for purging water accumulated in an inlet pipe.
Figure 24:
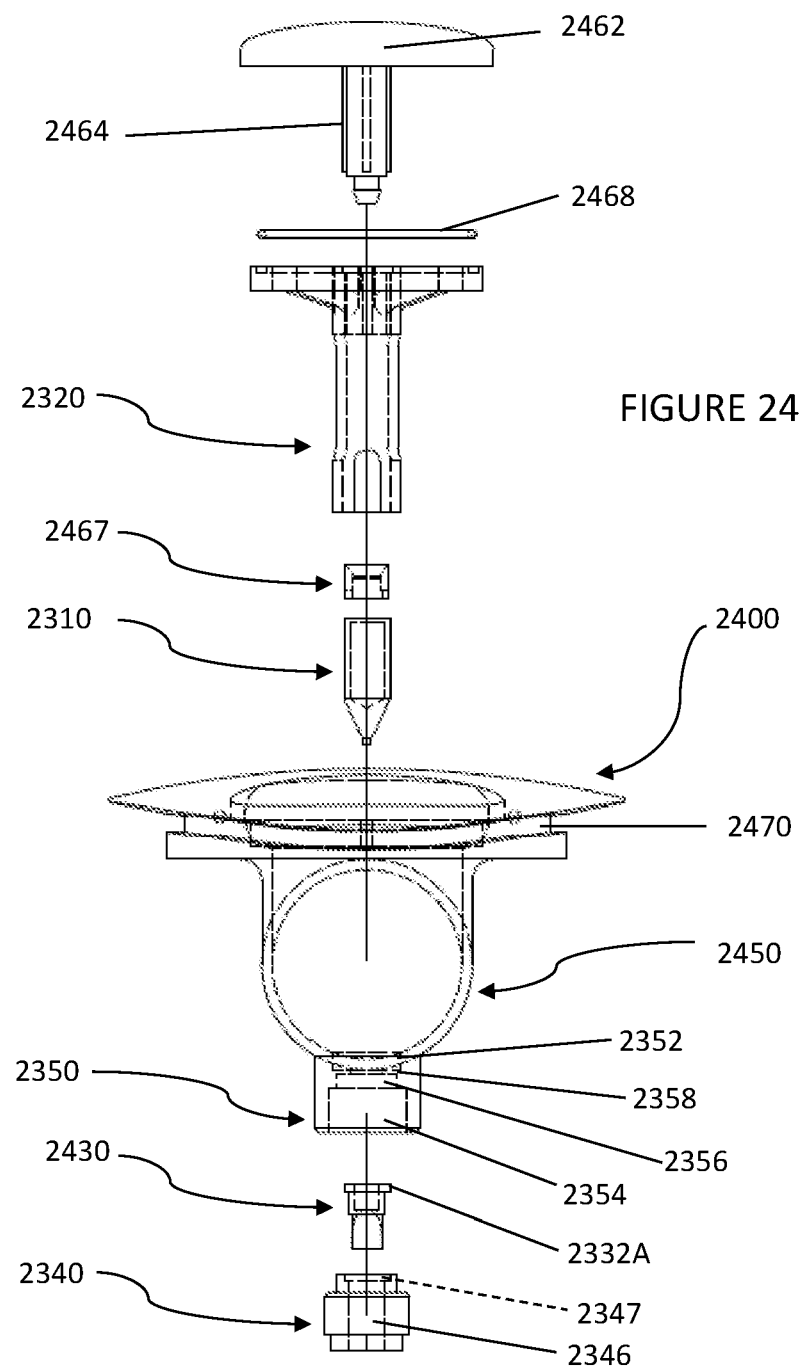
FIG. 24 is a schematic exploded end view of the tapered end inlet component of FIG. 23, showing some internal detail in broken lines.

As shown in the exploded views of FIGS. 23 and 24, the valve arrangement 2300 comprises a float member 2310, which in the illustrated embodiment is generally cylindrical in external shape and which has a tapered lower end region 2312. The tapered lower end region 2312 is substantially conical in shape in the illustrated embodiment.

The float member 2310 is, in use, provided within a tubular float guide 2320, which is provided with slots or apertures 2322 for allowing passage of water that is to be purged therethrough. In the illustrated embodiment the slots 2322 comprise first and second higher axially extending slots 2322A, which in this embodiment are diametrically opposed, and a lower axially extending slot 2322B. In the illustrated embodiment the slots 2322A, 2322B each have an angular extent of about 45 degrees (in the transverse circumferential direction of the float guide 2320) and the lower axially extending slot 2322B has an angular separation from each higher axially extending slot 2322A of about 45 degrees. The lower axially extending slot 2322B allows water accumulated on the floor of the air feed pipe to flow to the purge outlet, as will be described in due course.

The valve arrangement 2300 further comprises a duckbill valve 2330. The duckbill valve 2330 comprises a first end region 2332, which provides an inlet end of the duckbill valve 2330 and may also, in use, be regarded as defining a valve arrangement outlet 2333 through which water can be purged. The first end region 2332 also provides an outwardly extending flange 2332A. The duckbill valve 2330 further comprises a second end region 2334, which provides an outlet end of the duckbill valve 2330. The second, outlet, end region 2334 of the duckbill valve 2330 comprises opposed elastomeric parts which are adapted to be forced apart by excess pressure from an upstream (duckbill valve inlet end) direction to allow fluid to flow through the duckbill valve, but which are biased together to a valve closed configuration to resist or prevent flow of fluid through the duckbill valve in the reverse direction. In the illustrated valve arrangement 2300 the duckbill valve is constructed in one piece from an EPDM rubber or similar flexible elastomer material and has an operational diameter of between 4 mm to 6 mm, although embodiments include duckbill valves with operational diameters up to about 20 mm or more. It will be appreciated that the structure and operation of duckbill valves is known per se, and will not be described in detail herein.

The valve arrangement 2300 further comprises a duckbill retainer 2340 for retaining the duckbill valve 2330 relative to a valve housing part 2350 (and, in the illustrated embodiment, relative to a pipe or the like from which water is to be purged). The duckbill retainer 2340 provides a first end region 2342, an intermediate region 2343 and a second end region 2344.

The intermediate region 2343 has an exterior cylindrical wall provided with a male helical thread, which facilitates connection to the valve housing part 2350.

The first end region 2342, which is above the intermediate region 2343 in use, is of slightly smaller external diameter than the intermediate region 2343 and provides a flange accommodating recess 2347 (shown in FIG. 24) for accommodating the outwardly extending flange 2332A of the duckbill valve 2330. The depth of the flange accommodating recess 2347 is slightly smaller than the thickness of the flange 2332A, so that when the flange 2322A is located in the flange accommodating recess 2347 (with a lower surface of the flange 2332A engaging the bottom of the recess) the uppermost part of the flange 2332A can project upwardly a small distance out of the recess, and an upper surface of the flange 2332A is slightly higher than, and proud of, an upper surface of the duckbill retainer 2340. By way of example, in an embodiment the thickness of the flange is 2 mm and the depth of the flange accommodating recess 2347 is 1.75 mm. This allows the upper surface of the flange to be forced against a surface provided by the valve housing part 2350 (as will be described hereafter) to effect a seal 2332A, while helping to prevent undesired deformation of the flange 2332A by having most of the thickness of the flange 2332A located in and supported by the flange accommodating recess 2347.

The second end region 2344, which is lower than the intermediate region 2343 in use, provides a hexagonal exterior configuration to facilitate fastening and unfastening of the duckbill retainer 2340 to the valve housing part 2350 using a rotational fastening tool of the type used to operate a hexagonal head of a bolt, or a hexagonal nut.

The duckbill retainer 2340 is provided with a passageway 2346 which extends substantially axially therethrough. In use the passageway 2346 accommodates part of the duckbill valve 2330 and allows water to flow therethrough. The axial passageway 2346 is of sufficient diameter to give clearance to the duckbill valve 2330 so that its operation is not compromised. The flange accommodating recess 2347 may be regarded as a widened upper termination of the passageway 2346.

It will be appreciated that in the illustrated embodiment the check valve arrangement 2300 is incorporated into a shaped end piece 2400, which is suitable for feeding air into a first end of a diffuser and which has many similarities in form and function to shaped end piece 1000 described above, the description of which should be considered incorporated into the description of shaped end piece 2400. Further, it will be appreciated that the following description in relation to the shaped end piece 2400, other than that relating to the purge valve arrangement, may be of direct relevance to the shaped end piece 1000 and other shaped end pieces described above.

The shaped end piece 2400 provides an air inlet arrangement 2450, integrally formed therewith. The air inlet arrangement 2450 comprises a passage 2430 which extends through the shaped end piece 2400 and which has a gas outlet provided as an opening 2432 in a support surface part 2424 and a gas inlet 2434 provided by a pipe connection 2436 in fluid communication with the passage 2430. The pipe connection 2436 is adapted for connection to an air supply pipe or hose, and may comprise any suitable type of connection, for example, a male, or spigot-type, connection, or a female, or socket-type, connection. Further, any desired type of connection-securing arrangement, such as a screw threaded or other type of hose or pipe coupling may be used.

The air inlet 2450 is provided with a check valve 2460 (sometimes called a non-return valve) comprising a disc or lift 2462, which can be lifted off a seat formed by the opening 2432, and which is retained in the opening 2432 by a stem 2464 attached to the a disc or lift 2462 which is retained in a stem guide 2466 provided in the opening 2432. A stem retainer 2467, which is of greater diameter than the stem 2464, is in use attached to the bottom of the stem 2464 so that the stem is retained in a part of the stem guide 2466 which is of large enough diameter to accommodate the stem 2464, but impassable by the stem retainer 2467, thus limiting upwards travel of the lift 2462.

A seal 2468 is provided between the lift 2462 and the opening 2432 to enhance sealing when the check valve 2460 is closed.

Figure 25:
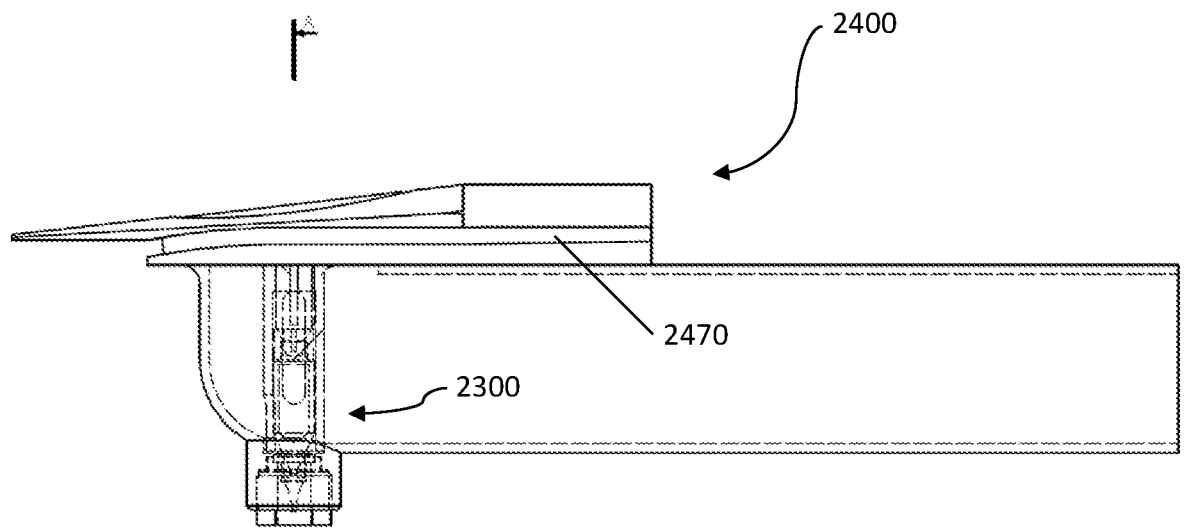
FIG. 25 is a schematic side view of the tapered end inlet component of FIG. 23, assembled, and in a passive, non-air flow configuration, showing some internal detail in broken lines.
Figure 26:
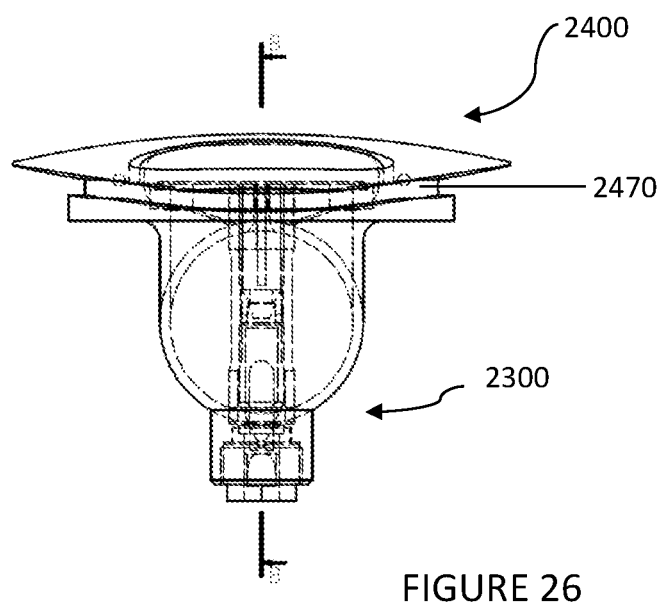
FIG. 26 is a schematic end view of the tapered end inlet component as shown in FIG. 25, showing some internal detail in broken lines.

As illustrated in FIG. 24, and also FIGS. 25 and 26, the shaped end piece 2400 provides a substantially horizontally extending groove 2470 into which an edge of an upper wall of a diffuser base may be received in order to facilitate connection of the shaped end piece 2400 to the diffuser base. In the illustrated example, the groove 2470 may be shaped to receive an edge of an upper wall 34 of diffuser body 30 which defines cut-out 1070, as illustrated in FIG. 10(*c*) described above.

The valve arrangement further comprises a valve housing part 2350, which in this embodiment is provided as part of the air inlet arrangement 2450 (or air feed pipe) which feeds air to the diffuser. The valve housing part 2350 provides an upper circular recess 2352, for seating the bottom of the tubular float guide 2320, and a lower circular recess 2354 for accommodating much of the duckbill retainer 2340. The lower circular recess 2354 provides a female helical thread on its internal wall, so that the duckbill retainer 2340 can be screwed into the lower circular recess 2354. An upper part 2356 of the lower circular recess 2354 is of reduced diameter and in use receives at least part of the first end region 2342 of the duckbill retainer 2340, and an in use upper part of the duckbill valve, including the flange 2332A. A small shoulder 2358 is provided between the upper circular recess 2352 and the upper part 2356 of the lower circular recess 2354, against which the upper part of the duckbill valve 2330, and in particular the part corresponding to the upper surface of the outwardly extending flange 2332A of the duckbill valve 2330, is pressed, in use, by the duckbill retainer 2340. The threaded engagement of the duckbill retainer 2340 and lower circular recess 2354 provide firm, sealed engagement of the flange 2332A against the shoulder 2358 by tightening of the threaded connection when the duckbill retainer 2340 is screwed into the lower circular recess 2354. Undesired deformation of the flange 2332A (and consequent deformation of the valve arrangement outlet 2333, which might compromise sealing) is substantially prevented by most of the thickness of the flange 2332A being located in and supported by the flange accommodating recess 2347. The axial length of the first end region 2342 of the duckbill retainer 2340 and the axial length of the upper part 2356 of the lower circular recess 2354 are dimensioned to provide a good seal between the flange 2332A and the shoulder 2358, while avoiding the possibility of the first end region 2342 bearing unduly hard against (and possibly damaging) the shoulder 2358 when the intermediate region 2343 of the duckbill retainer 2340 is fully tightened into the (main, wider part of the) lower circular recess 2354.

The upper circular recess 2352 and lower circular recess 2354 are in fluid communication to provide an outlet passage through which water may be purged. However, it should be appreciated that the minimum diameter of this outlet passage, at the small shoulder 2358, is larger than the diameter of the valve arrangement outlet 2333 provided (in use) by the duckbill valve 2330, so the opening of the duckbill valve effectively provides the valve arrangement outlet 2333. As will be described hereafter, this provides, in use, a part which the tapered lower end region 2312 of the float member 2310 can seal against, and which being made of elastomer, rubber or the like, assists in providing an effective seal.

The outlet is preferably provided substantially at the lowest point of the diffuser air feed passage, and effectively provides an outlet in the floor, or lowest part, of the air feed passage.

FIG. 25 is a schematic side view of the embodiment of FIG. 23, assembled, and in a passive, non-air flow configuration, showing some internal detail in broken lines, and FIG. 26 is a schematic end view thereof, also showing some internal detail in broken lines.

Figure 27:
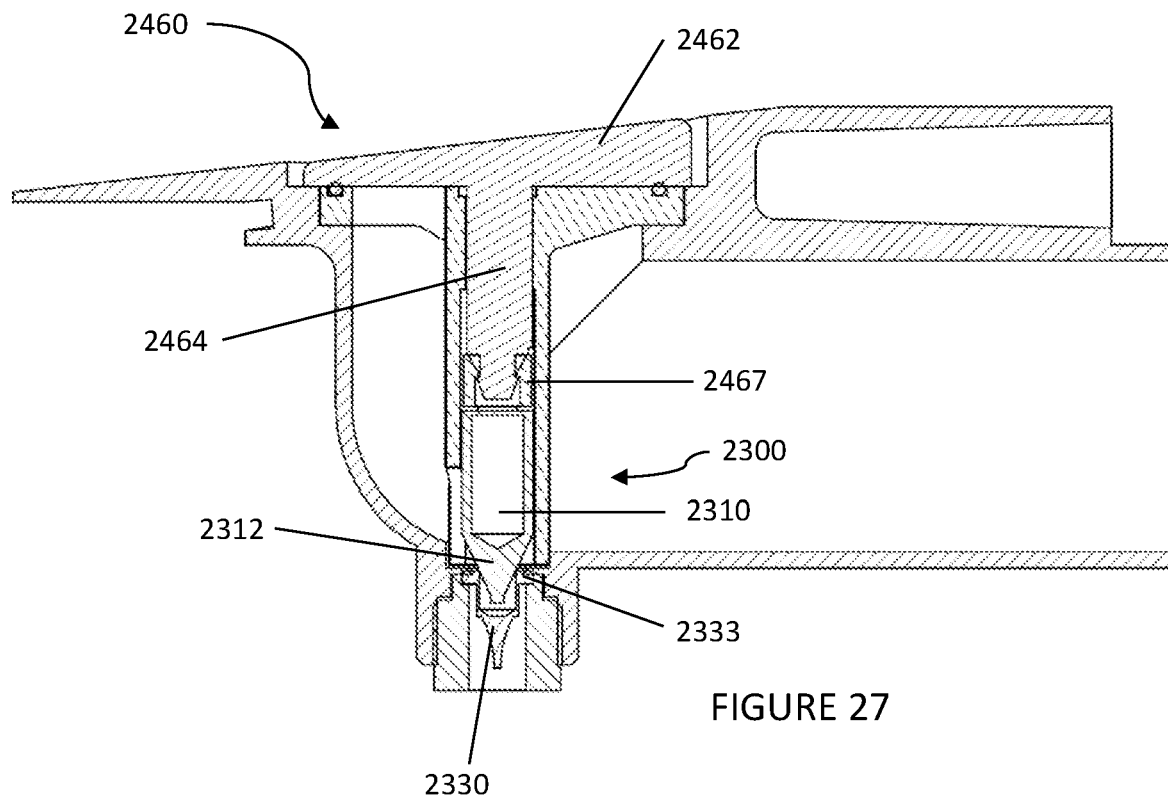
FIG. 27 is a schematic longitudinal cross sectional view of the tapered end inlet component as shown in FIG. 25.
Figure 28:
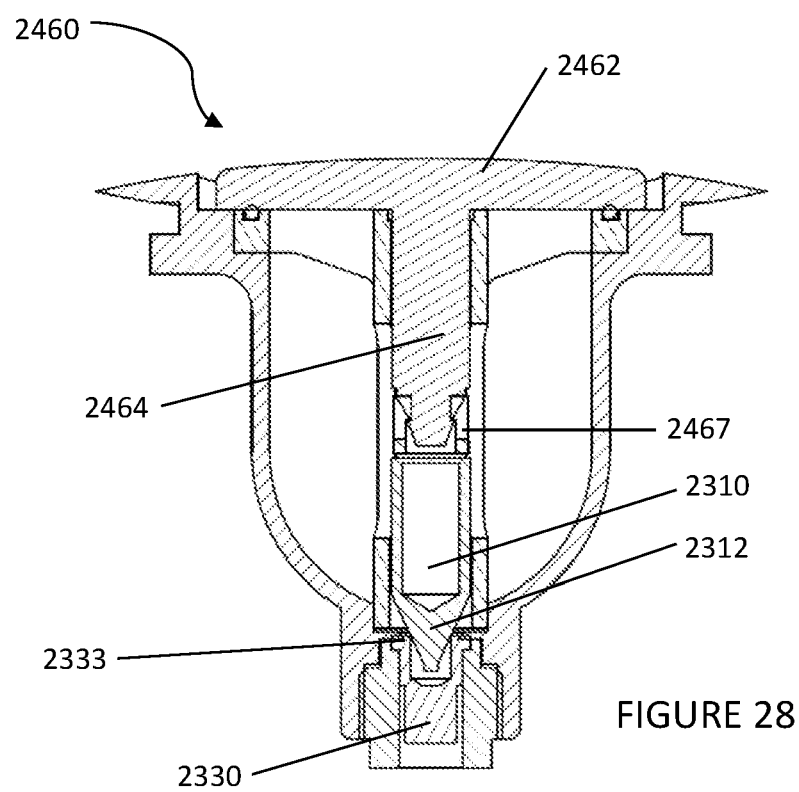
FIG. 28 is a schematic transverse cross sectional view of the tapered end inlet component as shown in FIG. 25.

FIGS. 27 and 28 are, respectively, schematic cross sectional views corresponding to the sections B-B and A-A in FIGS. 26 and 25 respectively, illustrating the assembly and configuration of the various parts when the air feed system and diffuser are a in a passive, non-air flow state.

In the passive, non-air flow configuration illustrated in FIGS. 25 to 28, the diffuser check valve 2460 is closed and the lift 2462 and stem 2464 are in their lowest positions. In this configuration the bottom of the stem retainer 2467 rests gently upon the top of the float member 2310 enhancing sealing of the tapered lower end region 2312 against the valve arrangement outlet 2333 provided by the duckbill valve 2330, and further maintaining the seal even in the presence of water which may need to be purged from the air feed passage.

Even in the passive, non-air flow configuration, when the head pressure of water outside the air feed passage is greater than the air pressure within the air feed passage, the duckbill valve 2330 is effective in preventing water from entering the air feed passage, as the resilient 'lips' of the duckbill valve form a watertight seal which is not broken by the external water pressure.

Figure 29:
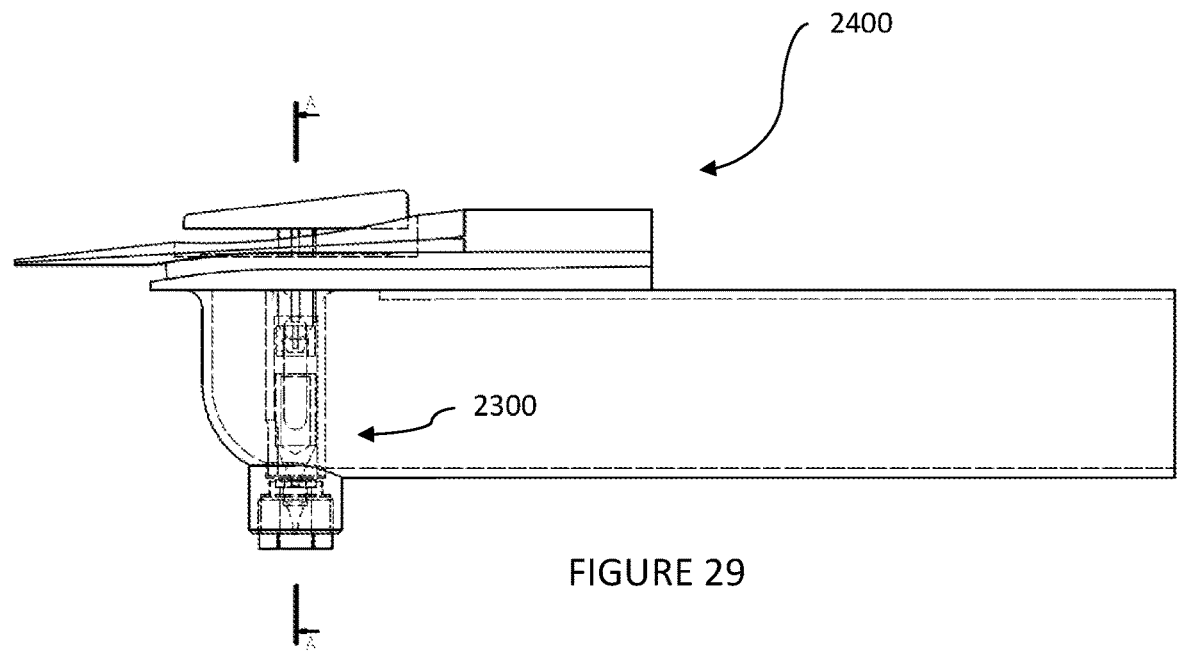
FIG. 29 is a schematic side view of the tapered end inlet component of FIG. 23, assembled, and in an active, air flow configuration, showing some internal detail in broken lines.

FIG. 29 is a schematic side view of the embodiment of FIG. 23, assembled, and in an active, air flow, configuration, showing some internal detail in broken lines.

Figure 30:
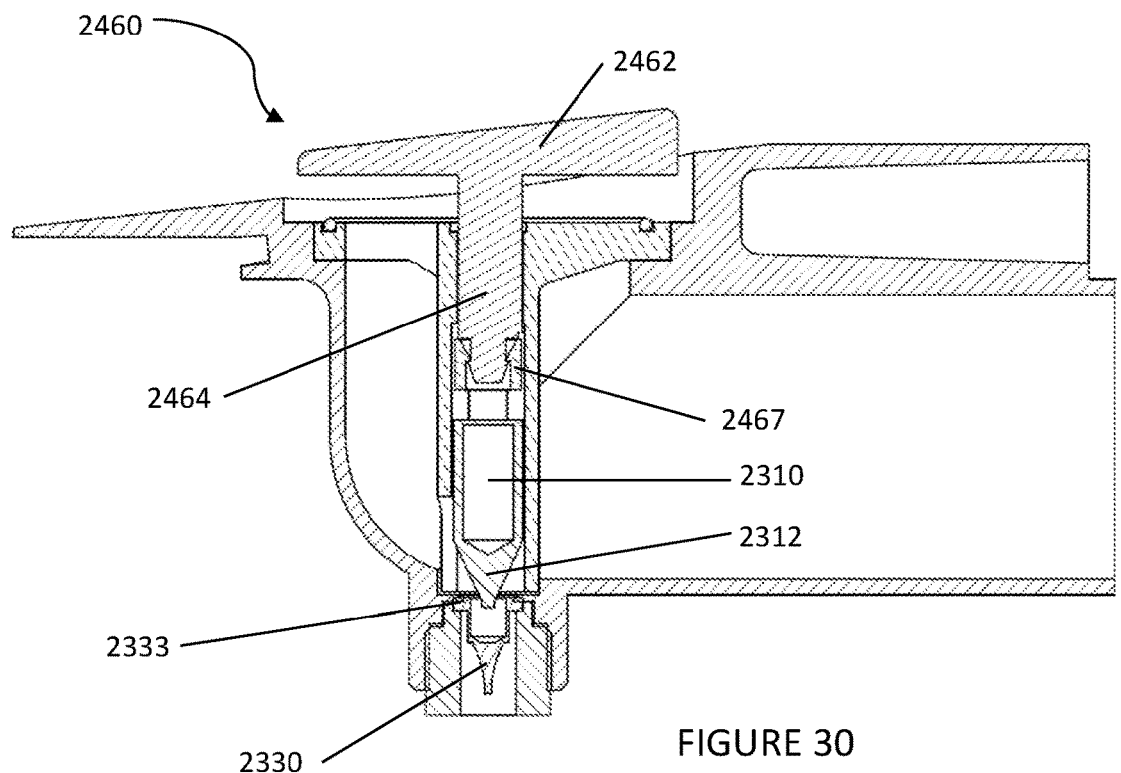
FIG. 30 is a schematic longitudinal cross sectional view of the tapered end inlet component as shown in FIG. 29.
Figure 31:
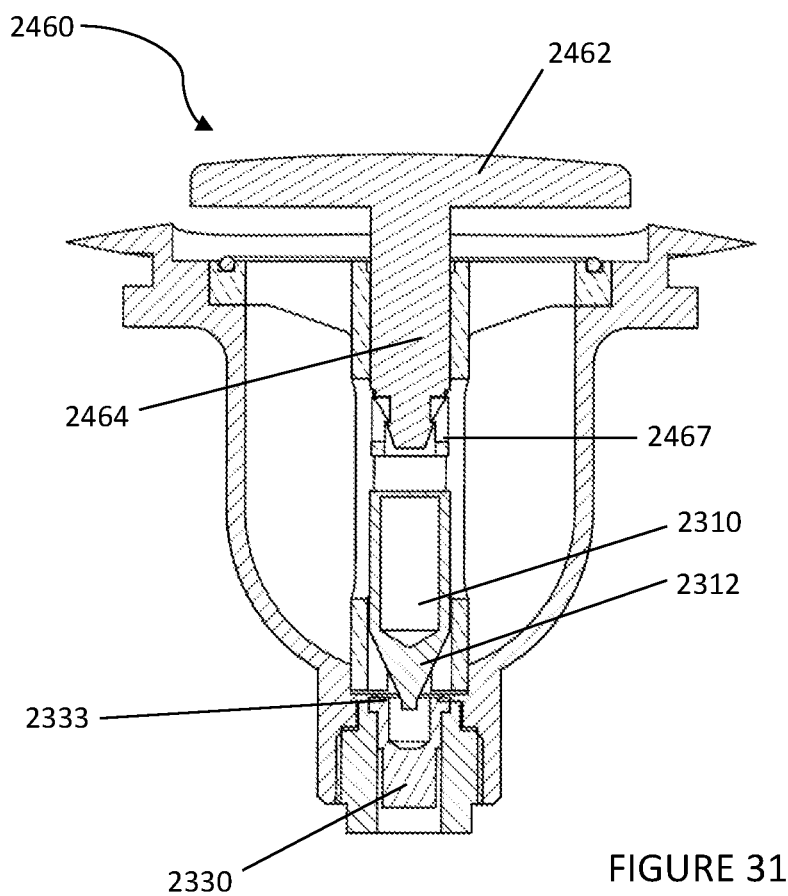
FIG. 31 is a schematic transverse cross sectional view of the tapered end inlet component as shown in FIG. 29.

FIG. 30 is a schematic longitudinal cross sectional view corresponding to the view of FIG. 27, but showing the active, air flow, configuration, and FIG. 31 is a schematic transverse cross sectional view corresponding to the view of FIG. 28, but showing the active, air flow, configuration.

As illustrated in FIGS. 29 to 31, when air is supplied to the diffuser, the diffuser check valve 2460 is opened and the lift 2462 and stem 2464 are in their raised positions. In this configuration the bottom of the stem retainer 2467 is raised to be clear of the top of the float member 2310, allowing the float member to rise, due to its buoyancy, if there is pooled water which needs to be purged. A raised position of the float member 2310 is illustrated in FIGS. 29 to 31. In the raised position the tapered lower end region 2312 of the float member 2310, is no longer sealed against (nor in contact with) the valve arrangement outlet 2333 provided by the duckbill valve 2330. Thus the valve arrangement outlet 2333 is effectively opened, providing a fluid passageway between the pooled water on the floor of the air inlet passage and the duckbill valve 2330. In the air supply state the air feed passageway is pressurised (normally to a pressure sufficient to expel air through the diffuser membrane into the surrounding water which is being treated) to a pressure greater than the head pressure of the water outside the diffuser and the air supply passage, and the air pressure inside the air supply passage forces the water to be purged through the duckbill valve 2430 in a purging action.

As the water to be purged is expelled from the air feed passage the water level in the air feed passage reduces, and the float member 2310, which is floating on the pooled water, descends accordingly. When all water the water to be purged has been expelled from the air feed passage the float member 2310 reseats the tapered lower end region 2312 thereof against the valve arrangement outlet 2333 provided by the duckbill valve 2330, effectively sealing the outlet and preventing undesired expulsion of air through the purge valve arrangement 2300. The air pressure in the air feed passageway may assist in forcing the float member into sealed engagement with the valve arrangement outlet 2333.

The described embodiment can therefore provide a purge valve which automatically purges accumulated water from the air feed pipe when air pressure is applied, which controls undesired expulsion of pressurised air therethrough, and which resists ingress of water, even when the air feed passage is not pressurised.

The float member 2310 is an example of a purge control element which is movable between a first control position in which it is not floating, for closing the water outlet when there is little or no accumulated water to be purged, and a second control position in which it floats due to the presence of water to be purged, thereby leaving a water outlet (in this embodiment valve arrangement outlet 2333) open, so that water can be purged therethrough.

The duckbill valve 2330 is an example of a flow check valve through which water is, in use, purged, and is a one-way valve which allows flow of water therethrough in the purging direction and in use substantially prevents flow of water therethrough in the reverse direction.

Figure 32:
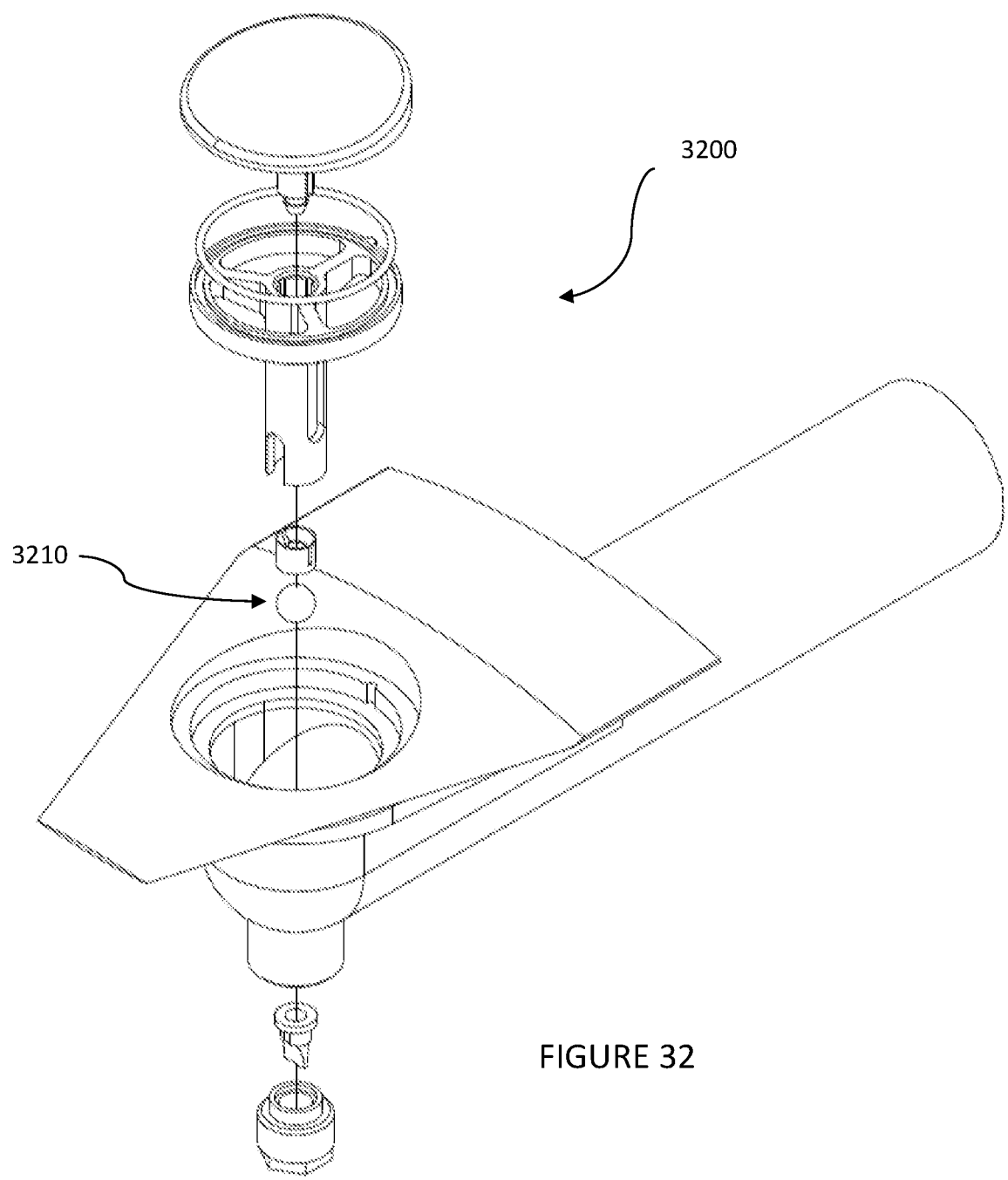
FIG. 32 is schematic perspective exploded view of an alternative embodiment of a tapered end inlet component, with similarities to the tapered end inlet component of FIG. 23, but with an alternative embodiment of a purge valve.
Figure 33:
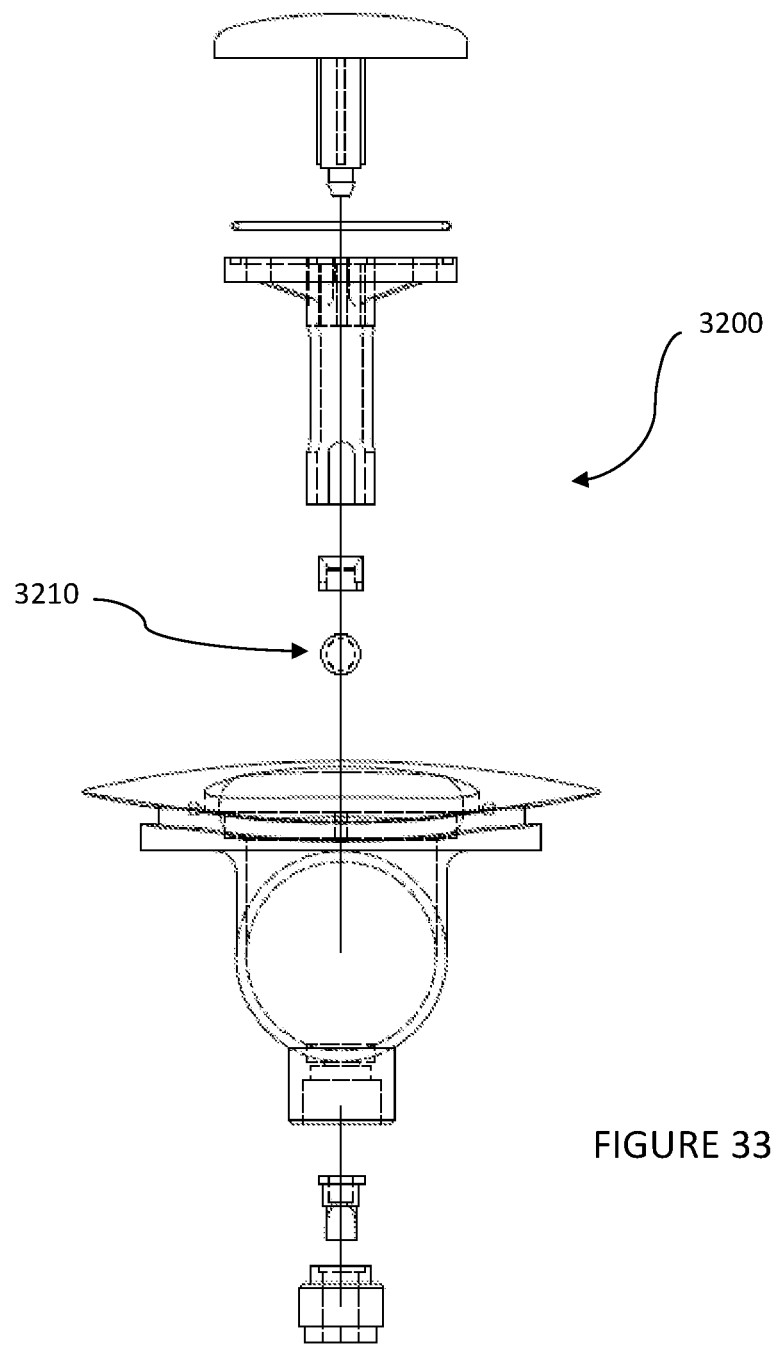
FIG. 33 is a schematic exploded end view of the tapered end inlet component of FIG. 32, showing some internal detail in broken lines.
Figure 34:
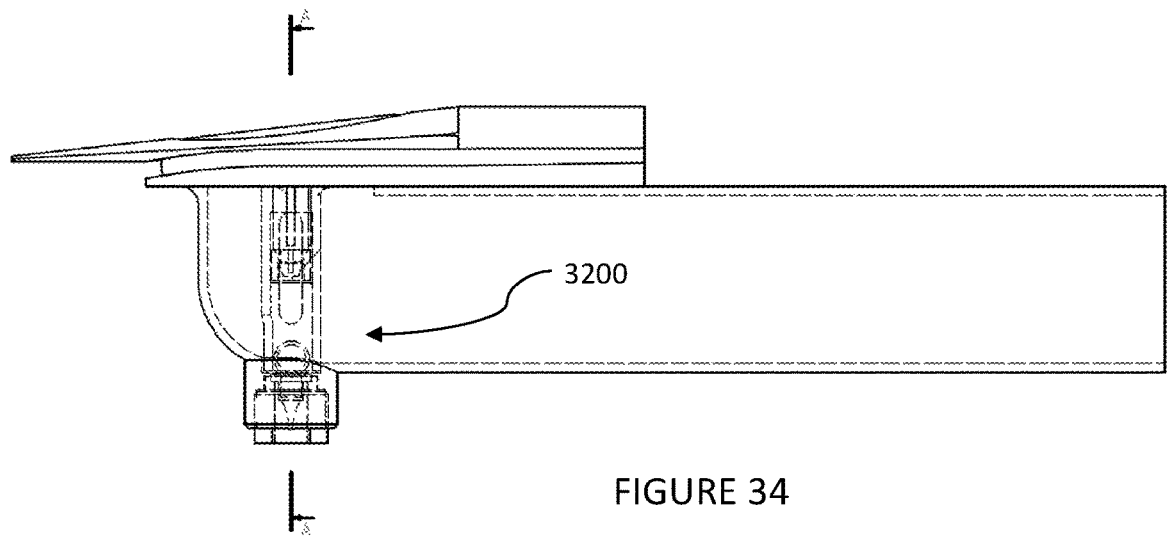
FIG. 34 is a schematic side view of the tapered end inlet component of FIG. 32, assembled, and in a passive, non-air flow configuration, showing some internal detail in broken lines.
Figure 35:
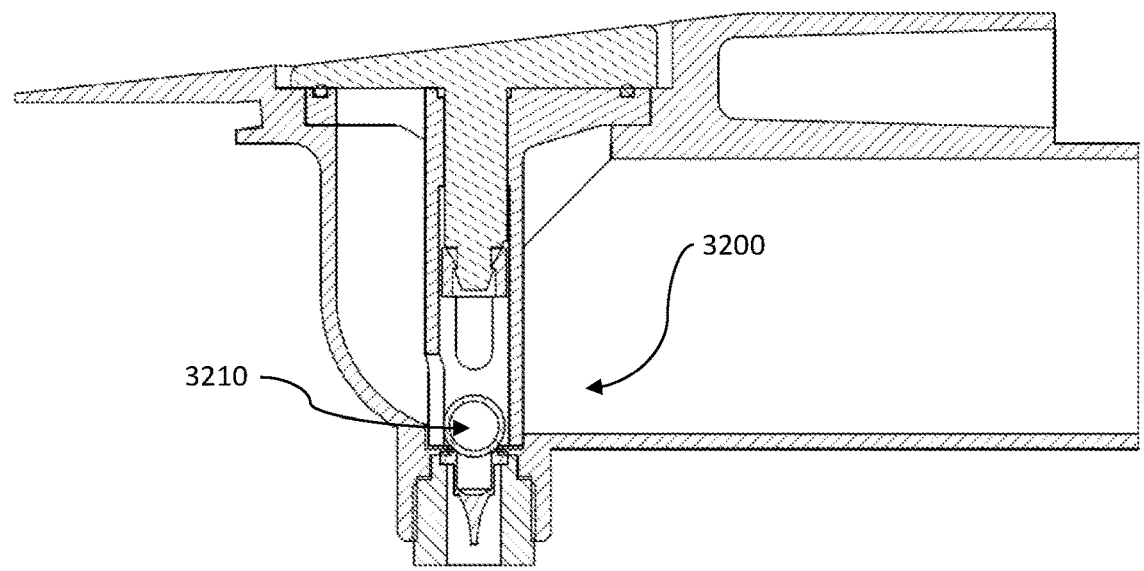
FIG. 35 is a schematic longitudinal cross sectional view of the tapered end inlet component as shown in FIG. 34.
Figure 36:
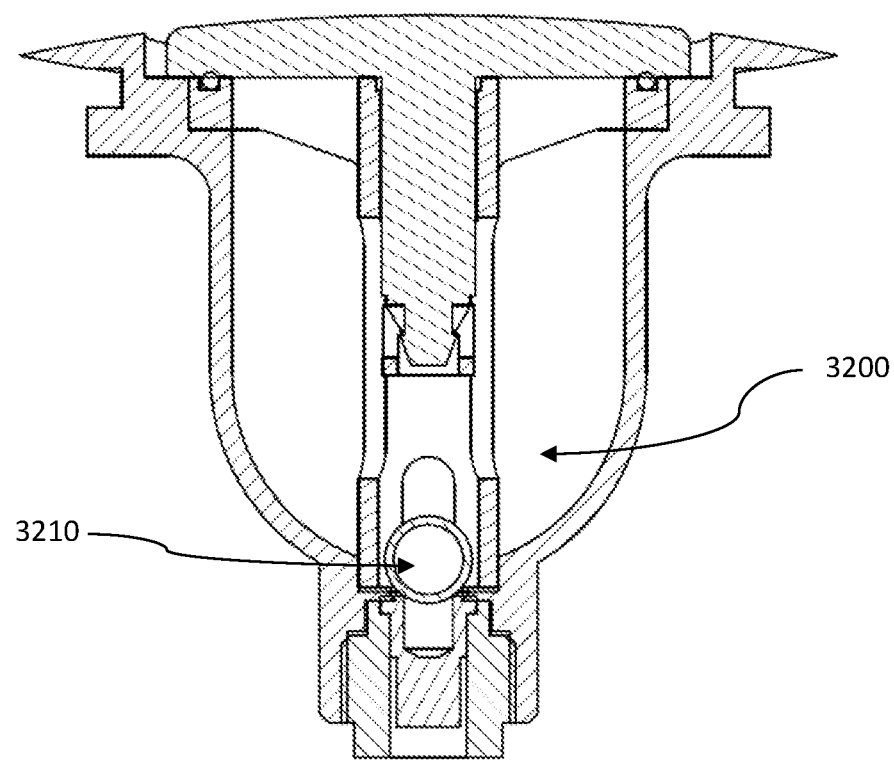
FIG. 36 is a schematic transverse cross sectional view of the tapered end inlet component as shown in FIG. 34.

FIGS. 32 to 36 illustrate an alternative embodiment of valve arrangement, generally designated by reference numeral 3200, in which the float member is in the form of a ball float 3210, rather than a generally cylindrical member (designated 2310 in FIGS. 23 to 31) which has a tapered lower end region 2312. FIGS. 32 and 33 show exploded views and FIGS. 34 to 36 illustrate internal detail and configuration in the circumstances that no air is being supplied to the diffuser, and no water requiring purging has accumulated. Thus the ball float 3210 is located on, and blocking the outlet. Initial consideration suggests that the use of a ball provides an inferior seal against the outlet, compared to the generally cylindrical member (designated 2310 in FIGS. 23 to 35) with its tapered lower end region 2312. It will also be appreciated that, as illustrated, in contrast to the embodiment of FIGS. 23 to 31, the position of the lift 2462 and stem 2462 of the diffuser check valve 2460 do not provide a downward force upon the float member in the closed configuration of the diffuser check valve 2460 to retain the floating member against the outlet (although, the dimensions of the stem and related components could be adjusted to provide such a force, if desired).

It will be appreciated that further variations are possible.

In the described embodiments of the purge valve arrangement the purge valve is provided in substantially the same location as the diffuser air check valve (e.g. 1060, 2460) and the tubular guide for the stem of the diffuser air check valve is extended to the floor of the air feed passage and used as the tubular float guide 2320. However, it should be appreciated that the purge valve arrangement need not be provided at or adjacent the diffuser air check valve, and could be provided in any desired position in the air feed passage.

Further, the floating member is not limited to the shapes described and could be any appropriate desired shape. The floating member may be hollow to provide a desired degree of buoyancy water, and/or may be or constructed from a material which has a suitable specific gravity, currently considered to be provided by a density less than 80% of that of water.

Further, if desired, a resilient member (e.g. a helical spring) or other biasing mechanism could be could be provided in the float guide (e.g. float guide 2320) to lightly bias the floating member downwardly and thereby improve sealing of the floating member against the outlet, while not preventing floating of the float member in the presence of water to be purged (at least, not in an active, air flow, state of the valve arrangement).

Further, although an example of a suitable assembly has been provided, alternatives are possible. For example, in the described embodiments the duckbill retainer is described as connecting to the valve housing part by means of screw threaded connection, but alternatives such as gluing or press fitting are possible.

The invention claimed is:

1. An elongate diffuser comprising:
a diffuser base comprising a diffuser body;
a membrane attached to the diffuser body;
wherein the membrane is connected to the diffuser body so that introduction of gas at a working pressure into the diffuser displaces part of the membrane from contact with the diffuser body to provide an elongate sealed compartment between the membrane and a surface provided mainly or wholly by the diffuser body, the compartment having a first lateral side interface region where the membrane contacts the diffuser body, a laterally intermediate region where the membrane is spaced apart from the diffuser body and a second lateral side interface region where the membrane contacts the diffuser body, and wherein gas can pass from the compartment through the membrane for aeration of a fluid in which the diffuser is immersed;
wherein the diffuser body surface which bounds the compartment comprises a recessed portion which is recessed away from the membrane between the first lateral interface region and the second lateral interface region, compared to a planar surface extending between the first lateral side interface region and the second lateral side interface region, to thereby provide the compartment with a larger transverse cross sectional size than would be provided by a planar surface extending from the first lateral side interface region to the second lateral interface region;

wherein a gas inlet is provided at a first axial end region of the diffuser body, and the compartment distributes gas between the inlet and a second axial end of the diffuser body; and wherein a gas inlet pipe of the diffuser provides a purge valve comprising:
- a purge control element movable between a first control position for closing a water outlet when there is little or no accumulated water to be purged, and a second control position for opening the water outlet in response to the presence of water to be purged; and
- a flow check valve through which water is, in use, purged, said flow check valve being a one-way valve which allows a flow of water therethrough in a purging direction and in use substantially prevents flow of water therethrough in a reverse direction.

2. The elongate diffuser according to claim 1, wherein the diffuser provides a gas outlet at the second axial end region thereof, so that the compartment can be used for distributing gas from a gas supply to another diffuser.

3. The elongate diffuser according to claim 1, wherein the diffuser has a length of at least 6 metres, a width of between about 10 cm and about 20 cm, or a length to width ratio of at least about 20.

4. The elongate diffuser according to claim 1, wherein when substantially no gas pressure is provided to the diffuser, the membrane is in a relaxed or collapsed state, so that the compartment does not exist; when a first, lower, level of gas pressure is provided to the diffuser, the membrane is inflated, but not stretched, to provide said compartment, which in this state has a first, smaller, cross-sectional size; when a second, higher, level of gas pressure is provided to the diffuser, the membrane is inflated, and also stretched, to increase the spacing between the membrane and the diffuser body at the laterally intermediate region of the compartment, so that in this state the compartment has a second, greater, cross-sectional size.

5. The elongate diffuser according to claim 1, wherein at least one axial end region the membrane is sealed with respect to a surface of the diffuser base such that a transversely extending region of the membrane is retained in a substantially convex cross sectional shape irrespective of whether the membrane is inflated.

6. The elongate diffuser according to claim 1, wherein at least one axial end region of the compartment is at least partially defined by a base surface end portion which is shaped to provide a smooth transition from a transverse cross sectional shape that is substantially convex closer to the corresponding end of the diffuser to a transverse cross sectional shape that is recessed closer to an axial centre of the diffuser.

7. The elongate diffuser according to claim 6, wherein at least one base surface end portion is provided by an end piece component manufactured separately to the diffuser body, and the diffuser base comprises said diffuser body and said at least one end piece component.

8. The elongate diffuser according to claim 7, wherein at least one said end piece component provides a blocking region which at least partially blocks a recess provided by the recessed portion of the diffuser body, at an end region of the diffuser.

9. The elongate diffuser according to claim 1, wherein the flow check valve comprises a flexible part which is deformable by positive net fluid pressure on an upstream side thereof, in a water purge flow direction, into an open configuration.

10. The elongate diffuser according to claim 9, wherein the flexible part of the flow check valve comprises an elastomer material, or wherein the flexible part of the flow check is configured to remain in a substantially closed configuration in the circumstances of positive net fluid pressure on a downstream side thereof, in a water purge flow direction.

11. The elongate diffuser according to claim 1, wherein the flow check valve comprises a duck-bill valve.

12. The elongate diffuser according to claim 1, wherein the purge control element comprises a float, and the purge valve further comprises a float restraining member positionable in a first, float restraining, position to retain the float substantially in the first, non-floating, position and moveable by providing increased air pressure in a vessel from which water is to be purged.

13. The elongate diffuser according to claim 1, wherein the flow check valve is provided downstream, in a water purge flow direction, of the water outlet.

14. The elongate diffuser according to claim 1, wherein the purge control element comprises a float, wherein the first control position corresponds to a non-floating position of the float, and wherein the second control position corresponds to a floating position of the float.

15. The elongate diffuser according to claim 14, wherein the water outlet comprises a seat engageable by the float.

16. The elongate diffuser according to claim 1, wherein the water outlet comprises an inlet part of the flow check valve.

17. An elongate diffuser comprising:
- a diffuser base comprising a diffuser body;
- a membrane attached to the diffuser body;
- wherein the membrane is connected to the diffuser body so that introduction of gas at a working pressure into the diffuser displaces part of the membrane from contact with the diffuser body to provide an elongate sealed compartment between the membrane and a surface provided mainly or wholly by the diffuser body, the compartment having a first lateral side interface region where the membrane contacts the diffuser body, a laterally intermediate region where the membrane is spaced apart from the diffuser body and a second lateral side interface region where the membrane contacts the diffuser body, and wherein gas can pass from the compartment through the membrane for aeration of a fluid in which the diffuser is immersed;
- wherein the diffuser body surface which bounds the compartment comprises a recessed portion which is recessed away from the membrane between the first lateral interface region and the second lateral interface region, compared to a planar surface extending between the first lateral side interface region and the second lateral side interface region, to thereby provide the compartment with a larger transverse cross sectional size than would be provided by a planar surface extending from the first lateral side interface region to the second lateral interface region;
- wherein a gas inlet is provided at a first axial end region of the diffuser body, and the compartment distributes gas between the inlet and a second axial end of the diffuser body,
- wherein the diffuser is provided with a mounting plate for mounting the diffuser to a support, the mounting plate comprising two mounting plate parts which can be connected to provide the mounting plate.

18. The elongate diffuser according to claim 17, wherein each of the two mounting plate parts can, when separated from the other, be operatively engaged with the diffuser body at substantially any desired axial position along the length of the diffuser body but when connected together can only be disengaged from the diffuser body at predefined axial positions.

19. The elongate diffuser according to claim 17, wherein when the mounting plate parts are not connected, neither extends across the full distance between engaged side portions of the diffuser, but when they are connected the combined two-part mounting plate extends between the engaged side portions of the diffuser and can thereby be retained in a fixed position relative to the diffuser.

20. The elongate diffuser according to claim 17, wherein each mounting plate part provides a connection formation for connecting with a connection formation of the other mounting plate part, and the two mounting plate parts are substantially identical.

* * * * *